(12) United States Patent
Chen et al.

(10) Patent No.: US 11,105,984 B2
(45) Date of Patent: Aug. 31, 2021

(54) RETENTION DEVICE FOR OPTOELECTRONIC CONNECTIONS

(71) Applicant: Finisar Corporation, Sunnyvale, CA (US)

(72) Inventors: Peng Chen, Shanghai (CN); Chong Heng, Shanghai (CN); Huaping Peng, Shanghai (CN); Shamei Shi, Shanghai (CN); William H. Wang, Pleasanton, CA (US); Feng Xu, Shanghai (CN); Ranran Zhang, Shanghai (CN); Naizhi Zhao, Shanghai (CN); Long Van Nguyen, San Jose, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/600,256

(22) Filed: Oct. 11, 2019

(65) Prior Publication Data

US 2021/0109297 A1    Apr. 15, 2021

(51) Int. Cl.
  *G02B 6/38*    (2006.01)
  *G02B 6/42*    (2006.01)
(52) U.S. Cl.
  CPC ......... *G02B 6/3846* (2013.01); *G02B 6/3806* (2013.01); *G02B 6/3877* (2013.01); *G02B 6/4245* (2013.01); *G02B 6/4278* (2013.01)
(58) Field of Classification Search
  CPC .. G02B 6/3806; G02B 6/3846; G02B 6/3877; G02B 6/4245; G02B 6/4278
  See application file for complete search history.

(56) References Cited

U.S. PATENT DOCUMENTS

| 5,151,961 | A | * | 9/1992 | Hvezda | G02B 6/3817 |
| | | | | | 385/60 |
| 6,062,739 | A | * | 5/2000 | Blake | G02B 6/3831 |
| | | | | | 385/56 |
| 7,972,067 | B2 | * | 7/2011 | Haley | G02B 6/3879 |
| | | | | | 385/78 |
| 8,920,044 | B2 | * | 12/2014 | Shimazu | G02B 6/3879 |
| | | | | | 385/76 |
| 10,175,426 | B2 | * | 1/2019 | Shouda | G02B 6/4292 |
| 10,288,820 | B2 | * | 5/2019 | Coenegracht | G02B 6/4472 |
| 2010/0008630 | A1 | * | 1/2010 | Marrapode | G02B 6/3897 |
| | | | | | 385/78 |

* cited by examiner

*Primary Examiner* — Ryan A Lepisto
(74) *Attorney, Agent, or Firm* — Blank Rome LLP

(57) ABSTRACT

An example method of assembling an optoelectronic assembly may include aligning a receptacle with a sleeve that may have a radial flange and with a ferrule that may have a light propagation axis. The method may include axially displacing one or more of the receptacle, the sleeve, and the ferrule such that the receptacle may be positioned at least partially within the sleeve and may at least partially surround the ferrule. The method may include aligning a fiber stub that may have a fiber stub pigtail and a fiber stub flange with the receptacle. The method may include axially displacing one or both of the fiber stub and the receptacle such that the fiber stub may be positioned in close proximity with the ferrule. The method may include coupling the sleeve via the radial flange and the fiber stub via the fiber stub flange with a retention device.

16 Claims, 27 Drawing Sheets

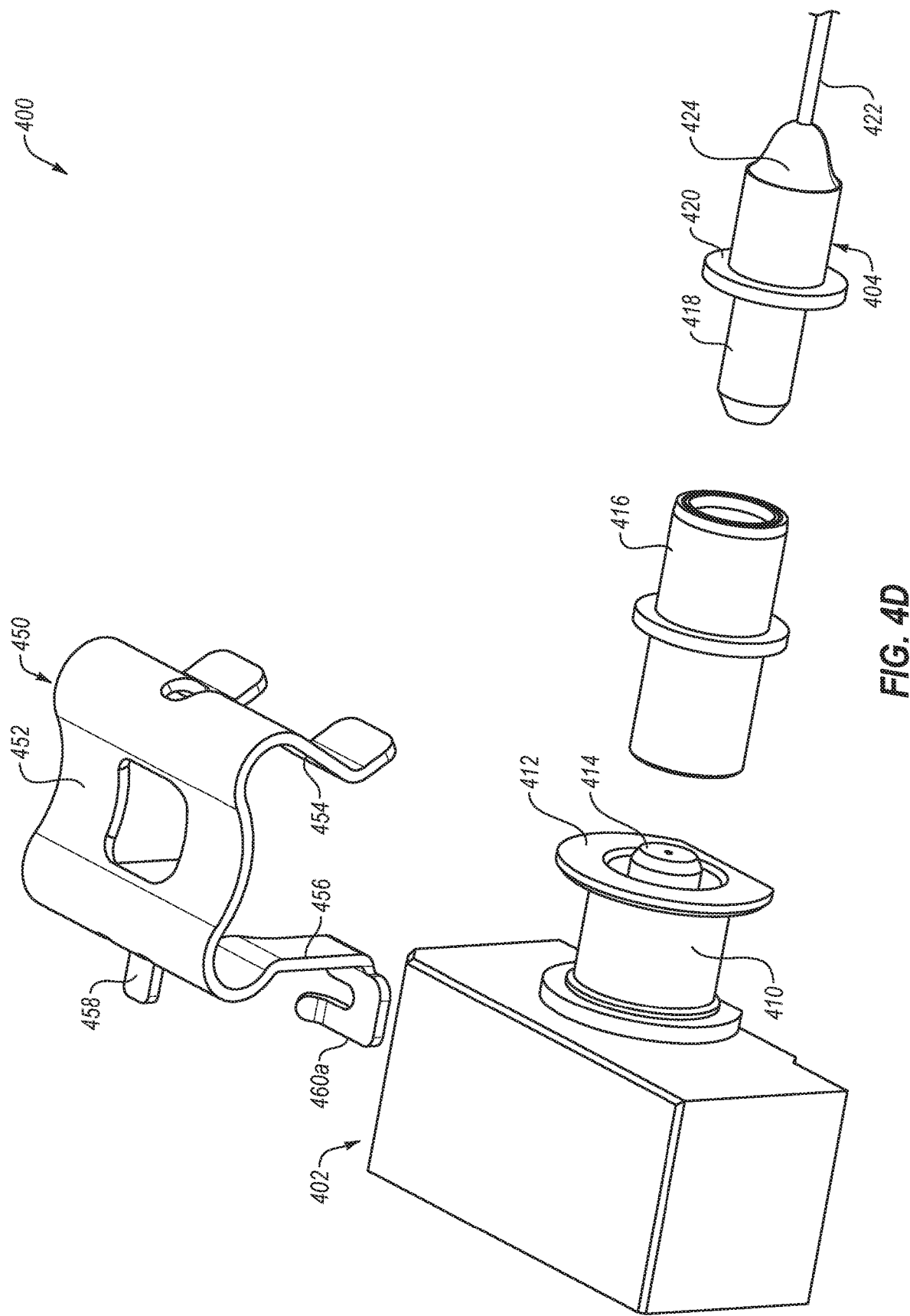

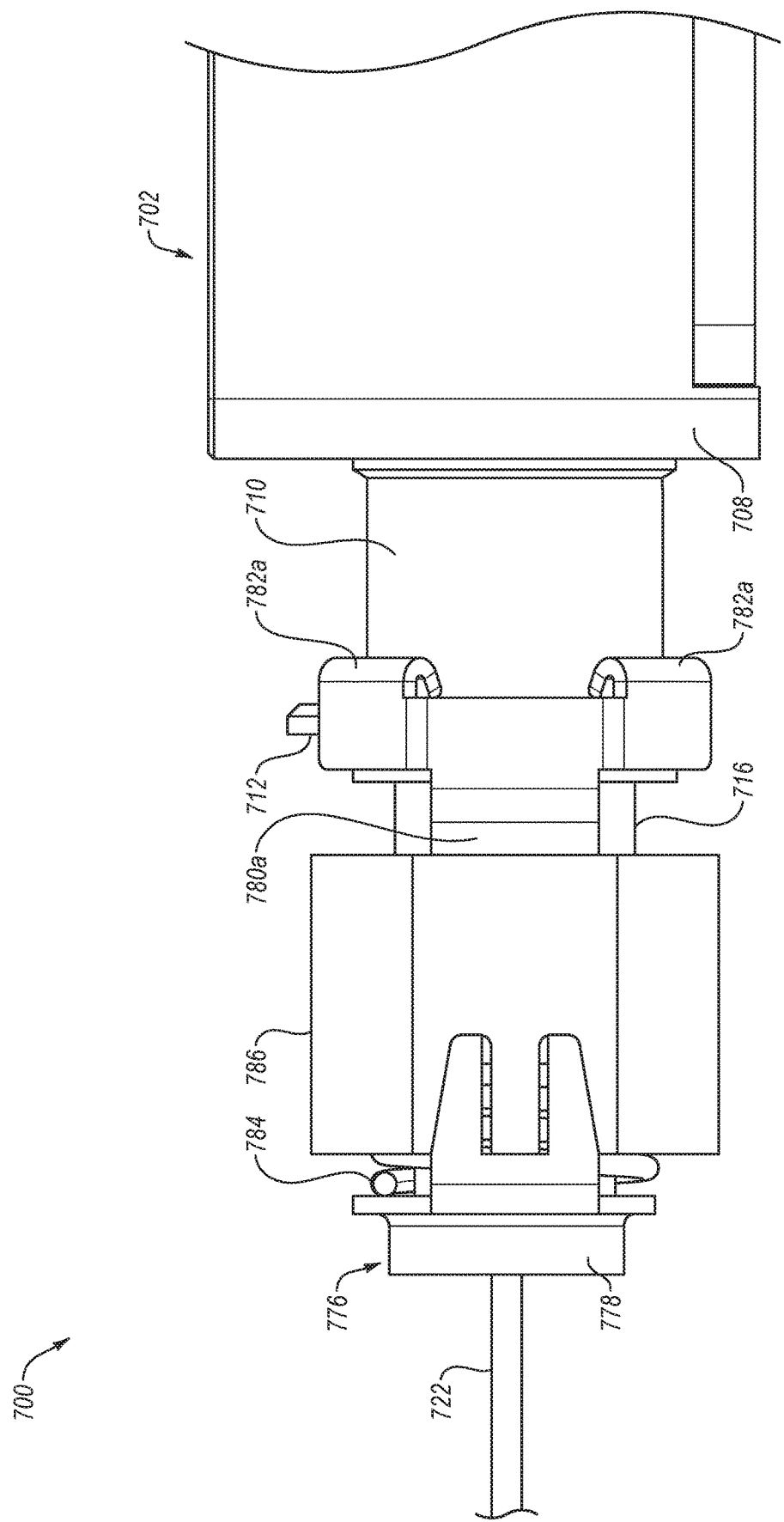

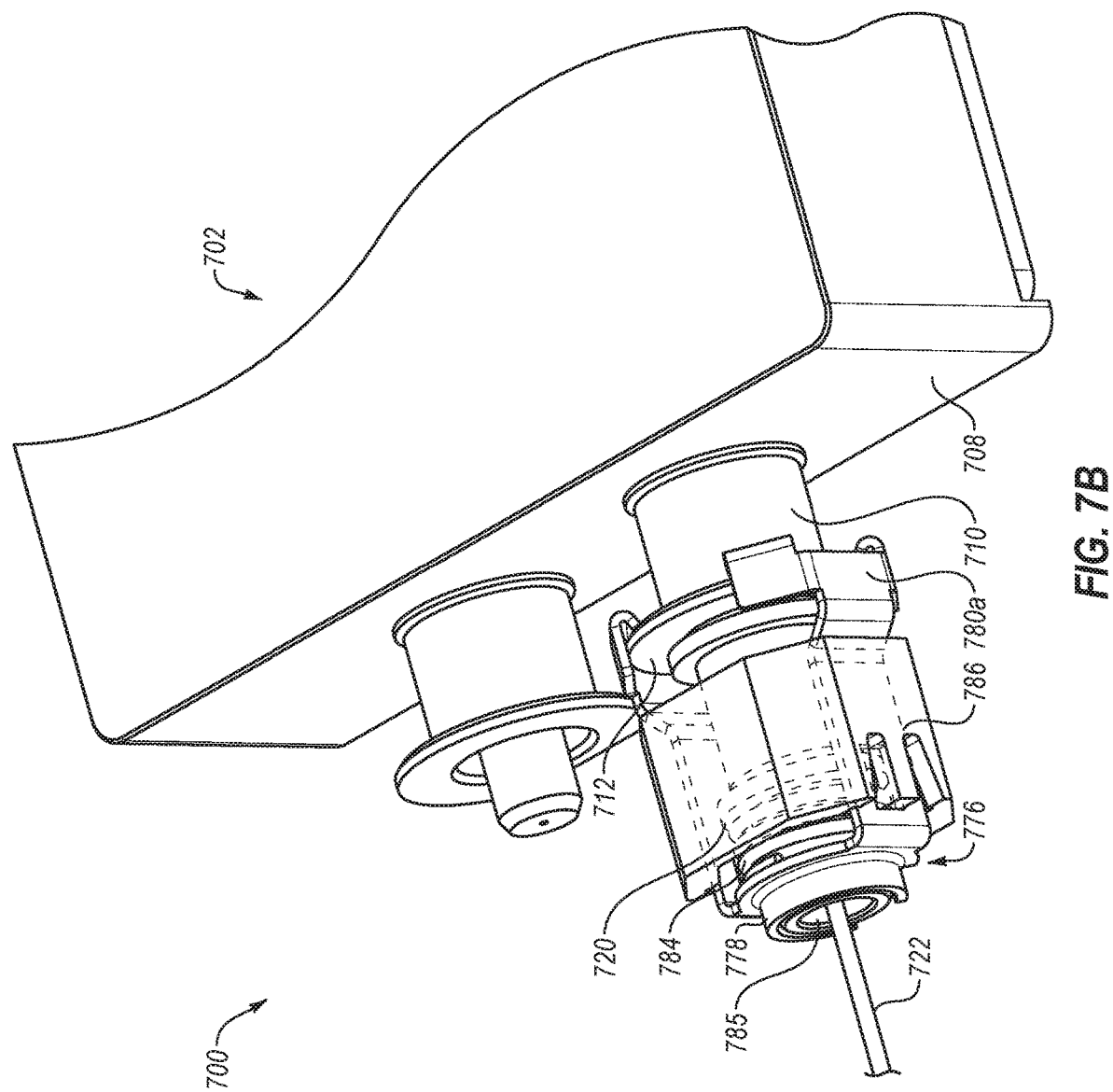

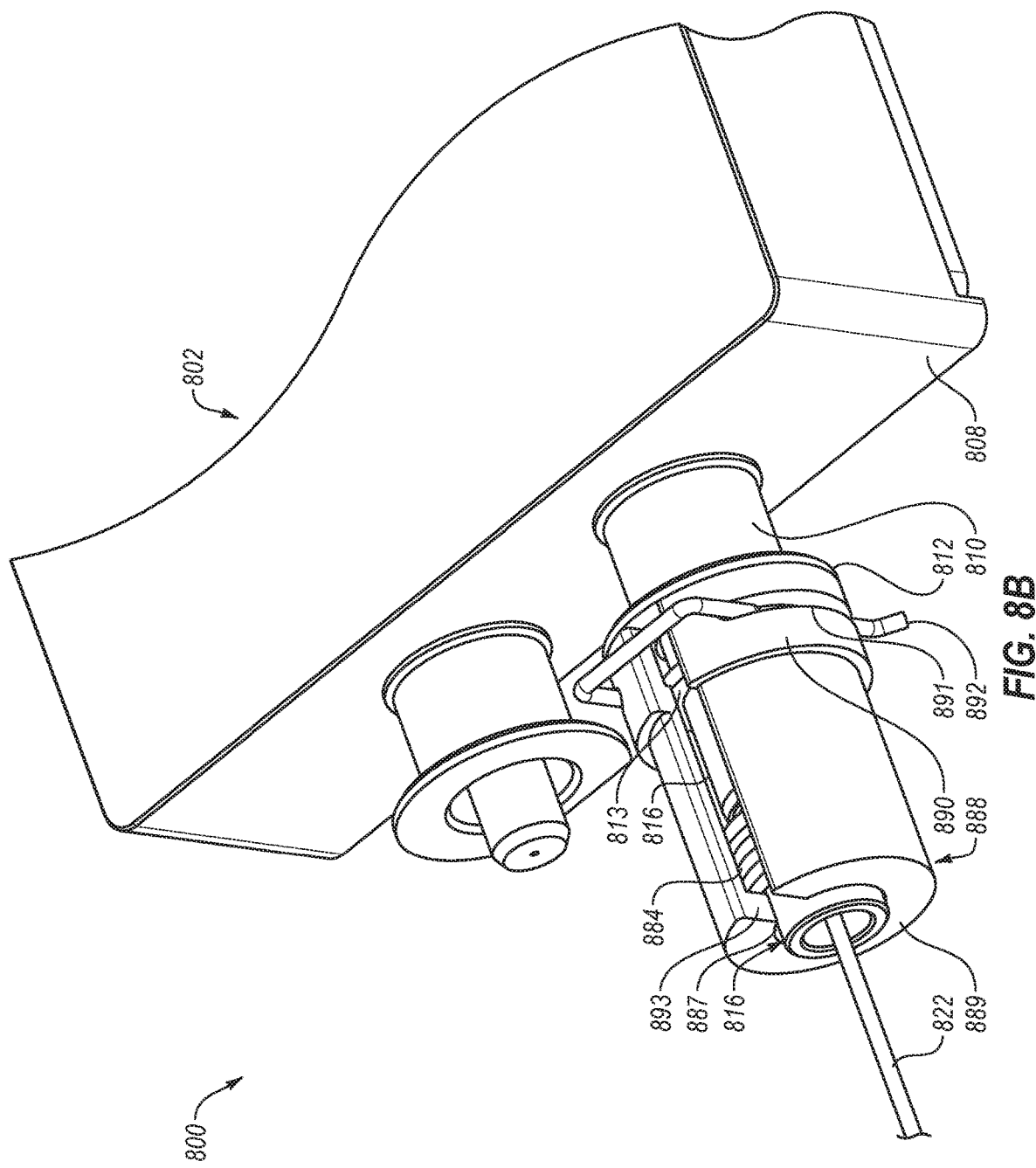

RETENTION DEVICE FOR OPTOELECTRONIC CONNECTIONS

FIELD

The embodiments discussed herein are related to retention devices for optoelectronic connections.

BACKGROUND

Unless otherwise indicated herein, the materials described herein are not prior art to the claims in the present application and are not admitted to be prior art by inclusion in this section.

An Optical Sub-Assembly (OSA) may transmit light to or receive light from an optical fiber. However, if the optical fiber is not properly mated to the OSA, optical loss may occur.

The subject matter described in the present disclosure is not limited to embodiments that solve any disadvantages or that operate only in environments such as those described above. Rather, this background is only provided to illustrate one example technology area where some embodiments described in the present disclosure may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described herein generally relate to a retention device for optoelectronic assembly connections.

In an example embodiment, an optoelectronic device interface connection may include an optoelectronic device including a port assembly. The port assembly may include a sleeve. The port assembly may also include a receptacle including a first end of the receptacle and a second end of the receptacle. The first end of the receptacle may be opposite the second end of the receptacle and may be configured to receive at least a first portion of a fiber stub. The second end of the receptacle may be at least partially received in the first end of the sleeve. One or both of the sleeve and the receptacle may comprise a radial flange. The port assembly may also include a ferrule positioned within at least a portion of the receptacle. The ferrule may be configured to be optically aligned with the fiber stub. The ferrule and the fiber stub may form an optical path. The optoelectronic device interface connection may also include a retention device including a first end of the retention device. The first end of the retention device may be configured to be positioned against a fiber side of a fiber stub flange of the fiber stub. A second end of the retention device may be configured to be positioned against an optoelectronic device side of the radial flange.

In some embodiments, the retention device may be configured to apply inwardly directed opposing forces to the optoelectronic device side of the radial flange and the fiber side of the fiber stub flange to maintain the ferrule and the fiber stub in close proximity.

In some embodiments, the retention device may include a base that may be configured to be substantially parallel to the optical path. A first spring may extend from a first end of the base. A second spring may extend from a second end of the base. The first spring may also form the first end of the retention device and may extend generally perpendicular from the base. The first spring may also include a first collar and may be configured to apply a first force to the fiber side of the fiber stub flange. The second spring may form the second end of the retention device and may extend generally perpendicular from the base. The second spring may include a second collar and may be configured to apply a second force to the optoelectronic device side of the radial flange.

In some embodiments, the retention device may include a base. The retention device may also include a first spring that may form the second end of the retention device and may extend away from the base. The first spring may include a first collar. The retention device may also include a first arm that may extend from the base of the retention device to the first end of the retention device. The retention device may also include a first finger that may extend from an end of the first arm and may be configured to engage the fiber side of the fiber stub flange. The retention device may also include a second arm that may extend from the base of the retention device to the first end of the retention device. The retention device may also include a second finger that may extend from an end of the second arm and may be configured to engage the fiber side of the fiber stub flange. The first spring may be configured to apply a first force to the optoelectronic device side of the radial flange. The first arm, the first finger, the second arm, and the second finger may be configured to apply a second force, opposite the first force, to the fiber side of the fiber stub flange.

In some embodiments, the retention device may include a base including a curved portion that may define a void within a center portion of the curved portion. A first portion of the curved portion may be configured to be substantially parallel to the optical path. A first spring may extend from the first end of the base. A second spring may extend from a second end of the base. The first spring may form the first end of the retention device and may extend away from the base. The first spring may be configured to apply a first force to the fiber side of the fiber stub flange. The second spring may form the second end of the retention device and may extend away from the base. The second spring may be configured to apply a second force to the optoelectronic device side of the radial flange. A tab may extend away from the second end of the base and above a first portion of the sleeve. A first finger may extend from a first end of the second spring and toward a second portion of the sleeve. A second finger may extend from a second end of the second spring and toward a third portion of the sleeve, opposite the second portion of the sleeve. The first finger and the second finger may extend toward each other. A distance between an innermost end of the first finger and an innermost end of the second finger may be shorter than an outer diameter of the sleeve.

In some embodiments, the retention device may include a first retention clamp that may form the first end of the retention device. The first retention clamp may be configured to form a first collar around the fiber stub. The first retention clamp may also be configured to interface with a first side of the fiber stub. The first retention clamp may also be configured to interface with a second side of the fiber stub, opposite the first side of the fiber stub. The first retention clamp may also be configured to apply a first force to the fiber side of the fiber stub flange. The retention device may also include a second retention clamp that may form the second end of the retention device. The second retention clamp may be configured to form a second collar around the sleeve. The second retention clamp may also be configured to interface with a first side of the sleeve. The second retention clamp may also be configured to interface with a second side of the sleeve, opposite the first side of the sleeve. The second retention clamp may also be configured to apply a second force to the optoelectronic device side of the radial flange. The retention device may also include a first arm that may extend from the first retention clamp to the second retention clamp. The retention device may also include a second arm, opposite the first arm, that may extend from the first retention clamp to the second retention clamp. The first arm and the second arm may be configured to apply inwardly directed opposing forces to the optoelectronic device side of the radial flange and the fiber side of the fiber stub flange through the first and second retention clamps to maintain the ferrule and the fiber stub in close proximity.

In some embodiments, the retention device may include a base that may form the first end of the retention device and may define a void within a center portion of the base such that a second portion of the fiber stub may be inserted through the void within the center portion of the base. The fiber stub flange may include a first end of the fiber stub flange and a second end of the fiber stub flange. The retention device may also include a first arm that may extend from the base of the retention device to the second end of the retention device. The retention device may also include a first finger that may extend from an end of the first arm and may be configured to engage the optoelectronic device side of the radial flange. The retention device may also include a second arm that may extend from the base of the retention device to the second end of the retention device. The retention device may also include a second finger that may extend from an end of the second arm and may be configured to engage the optoelectronic device side of the radial flange. The retention device may also include a spring that may extend around at least a portion of the fiber stub including a central axis substantially parallel to the optical path. A first end of the spring may be configured to apply a first force to the fiber side of the fiber stub flange. A second end of the spring may be configured to apply a third force, opposite the first force, to the base. The first arm, the first finger, the second arm, and the second finger may be configured to apply a second force, opposite the first force, to the optoelectronic device side of the radial flange.

In some embodiments, the retention device may include a retention sleeve that may be configured to interface with and surround a portion of the first arm and the second arm and to impose a second set of inwardly directed opposing forces to the first arm and the second arm such that the first arm and the second arm may be forced toward the sleeve.

In some embodiments, the retention device may include a retention sleeve configured to surround a portion of the receptacle. The retention sleeve may include an interior flange at a first end of the retention sleeve that may form the first end of the retention device. The retention sleeve may include a retention clip slot at a second end of the retention sleeve, opposite the first end of the retention sleeve. The retention device may also include a spring including a central axis substantially parallel to the optical path, a first end of the spring that may be configured to apply a first force to the fiber side of the fiber stub flange and a second end of the spring that may be configured to apply a third force, opposite the first force, to the interior flange. The retention device may also include a retention clip configured to be inserted into the retention clip slot and to apply a second force to an optoelectronic device side of a receptacle flange. The retention clip may be located between the receptacle flange and the radial flange. The first force and the second force may be applied to maintain the ferrule and the fiber stub in close proximity.

In another example embodiment, an optoelectronic assembly may include an OSA including an OSA box. The OSA may also include a port assembly that may be coupled to the OSA box. The port assembly may include a sleeve. The port assembly may also include a receptacle including a first end of the receptacle and a second end of the receptacle. The first end of the receptacle may be opposite the second end of the receptacle and may be configured to receive at least a first portion of a fiber stub. The second end of the receptacle may be at least partially received in the first end of the sleeve. One or both of the sleeve and the receptacle may comprise a radial flange. The port assembly may also include a ferrule positioned within at least a portion of the receptacle. The ferrule may be configured to be optically aligned with the fiber stub. The ferrule and the fiber stub may form an optical path. The OSA may also include a retention device including a first end of the retention device. The first end of the retention device may be configured to be positioned against a fiber side of a fiber stub flange of the fiber stub. A second end of the retention device may be configured to be positioned against an optoelectronic device side of the radial flange.

In some embodiments, the retention device may be configured to apply inwardly directed opposing forces to the optoelectronic device side of the radial flange and the fiber side of the fiber stub flange to maintain the ferrule and the fiber stub in close proximity.

In some embodiments, the retention device may include a base that may be configured to be substantially parallel to the optical path. A first spring may extend from a first end of the base. A second spring may extend from a second end of the base. The first spring may also form the first end of the retention device and may extend generally perpendicular from the base. The first spring may also include a first collar and may be configured to apply a first force to the fiber side of the fiber stub flange. The second spring may form the second end of the retention device and may extend generally perpendicular from the base. The second spring may include a second collar and may be configured to apply a second force to the optoelectronic device side of the radial flange.

In some embodiments, the retention device may include a base. The retention device may also include a first spring that may form the second end of the retention device and may extend away from the base. The first spring may include a first collar. The first spring also include a first arm that may extend from the base of the retention device to the first end of the retention device. The retention device may also include a first finger that may extend from an end of the first arm and may be configured to engage the fiber side of the fiber stub flange. The retention device may also include a second arm that may extend from the base of the retention device to the first end of the retention device. The retention device may also include a second finger that may extend from an end of the second arm and may be configured to engage the fiber side of the fiber stub flange. The first spring may be configured to apply a first force to the optoelectronic device side of the radial flange. The first arm, the first finger, the second arm, and the second finger may be configured to apply a second force, opposite the first force, to the fiber side of the fiber stub flange.

In some embodiments, the retention device may include a base including a curved portion that may define a void within a center portion of the curved portion. A first portion of the curved portion may be configured to be substantially parallel to the optical path. A first spring may extend from the first end of the base. A second spring may extend from a second end of the base. The first spring may form the first end of the retention device and may extend away from the base. The first spring may be configured to apply a first force to the fiber side of the fiber stub flange. The second spring may form the second end of the retention device and may extend away from the base. The second spring may be configured to apply a second force to the optoelectronic device side of the radial flange the fiber stub flange. A tab may extend away from the second end of the base and above a first portion of the sleeve. A first finger may extend from a first end of the second spring and toward a second portion of the sleeve. A second finger may extend from a second end of the second spring and toward a third portion of the sleeve, opposite the second portion of the sleeve. The first finger and the second finger may extend toward each other. A distance between an innermost end of the first finger and an innermost end of the second finger may be shorter than an outer diameter of the sleeve.

In some embodiments, the retention device may include a first retention clamp that may form the first end of the retention device. The first retention clamp may be configured to form a first collar around the fiber stub. The first retention clamp may also be configured to interface with a first side of the fiber stub. The first retention clamp may also be configured to interface with a second side of the fiber stub, opposite the first side of the fiber stub. The first retention clamp may also be configured to apply a first force to the fiber side of the fiber stub flange. The retention device may also include a second retention clamp may form the second end of the retention device, the second retention clamp may be configured to form a second collar around the sleeve. The second retention clamp may also be configured to interface with a first side of the sleeve. The second retention clamp may also be configured to interface with second side of the sleeve, opposite the first side of the sleeve. The second retention clamp may also be configured to apply a second force to the optoelectronic device side of the radial flange. The retention device may also include a first arm that may extend from the first retention clamp to the second retention clamp. The retention device may also include a second arm, opposite the first arm, that may extend from the first retention clamp to the second retention clamp. The first arm and the second arm may be configured to apply inwardly directed opposing forces to the optoelectronic device side of the radial flange and the fiber side of the fiber stub flange through the first and second retention clamps to maintain the ferrule and the fiber stub in close proximity.

In some embodiments, the retention device may include a base that may form the first end of the retention device and may define a void within a center portion of the base such that a second portion of the fiber stub may be inserted through the void within the center portion of the base. The fiber stub flange may include a first end of the fiber stub flange and a second end of the fiber stub flange. The retention device may also include a first arm that may extend from the base of the retention device to the second end of the retention device. The retention device may also include a first finger that may extend from an end of the first arm and may be configured to engage the optoelectronic device side of the radial flange. The retention device may also include a second arm that may extend from the base of the retention device to the second end of the retention device. The retention device may also include a second finger that may extend from an end of the second arm and may be configured to engage the optoelectronic device side of the radial flange.

The retention device may also include a spring that may extend around at least a portion of the fiber stub including a central axis substantially parallel to the optical path. A first end of the spring may be configured to apply a first force to the fiber side of the fiber stub flange. A second end of the spring may be configured to apply a third force, opposite the first force, to the base. The first arm, the first finger, the second arm, and the second finger may be configured to apply a second force, opposite the first force, to the optoelectronic device side of the sleeve flange.

In some embodiments, the retention device may include a retention device configured to surround a portion of the receptacle. The retention device may include an interior flange at a first end of the retention device that may form the first end of the retention device. The retention device may include a retention clip slot at a second end of the retention device, opposite the first end of the retention device. The retention device may also include a spring including a central axis substantially parallel to the optical path, a first end of the spring that may be configured to apply a first force to the fiber side of the fiber stub flange and a second end of the spring that may be configured to apply a third force, opposite the first force, to the interior flange. The retention device may also include a retention clip configured to be inserted into the retention clip slot and to apply a second force to an optoelectronic device side of a receptacle flange. The retention clip may be located between the receptacle flange and the radial flange. The first force and the second force may be applied to maintain the ferrule and the fiber stub in close proximity.

In an example method, a method of assembling an optoelectronic assembly may include aligning a receptacle with a sleeve that may have a radial flange and with a ferrule that may have a light propagation axis. The method of assembling the optoelectronic assembly may also include axially displacing one or more of the receptacle, the sleeve, and the ferrule such that the receptacle may be positioned at least partially within the sleeve and may at least partially surround the ferrule. The method of assembling the optoelectronic assembly may also include aligning a fiber stub that may have a fiber stub pigtail and a fiber stub flange with the receptacle. The method of assembling the optoelectronic assembly may also include axially displacing one or both of the fiber stub and the receptacle such that the fiber stub may be positioned in close proximity with the ferrule. The method of assembling the optoelectronic assembly may also include coupling the sleeve via the radial flange and the fiber stub via the fiber stub flange with a retention device.

In some methods, the method of assembling the optoelectronic assembly may include positioning a first end of the retention device against an optoelectronic device side of the radial flange. The method of assembling the optoelectronic assembly may also include positioning a second end of the retention device against a fiber side of the fiber stub flange.

In another example embodiment, a fiber-to-fiber connection assembly may include a split sleeve including a first end of the split sleeve, a second end of the split sleeve. The first end of the split sleeve may be configured to receive at least a portion of a first fiber stub. The second end of the split sleeve may be configured to receive at least a portion of a second fiber stub. The first fiber stub and the second fiber stub may be configured to be optically aligned with the first fiber stub and the second fiber stub and may form an optical path. The fiber-to-fiber connection assembly may also include a retention device. The retention device may include a first end of the retention device that may be configured to be positioned against a first fiber side of a first fiber stub flange of the first fiber stub. The retention device may also include a second end of the retention device that may be configured to be positioned against a second fiber side of a second fiber stub flange of the second fiber stub. The fiber-to-fiber connection assembly may also include a retention sleeve that may be configured to surround a portion of the first fiber stub and the second fiber stub. The retention sleeve may include an interior flange at a first end of the retention sleeve and may form the first end of the retention device. The retention sleeve may also include a retention clip slot at a second end of the retention sleeve, opposite the first end of the retention sleeve. The fiber-to-fiber connection assembly may also include a spring including a central axis substantially parallel to the optical path that may be configured to apply a first force to the first fiber side of a first fiber stub flange. The fiber-to-fiber connection assembly may also include a retention clip that may be configured to be inserted into the retention clip slot and to apply a second force to the second fiber side of a second fiber stub flange. The first force and the second force may be applied to maintain the first fiber stub and the second fiber stub in close proximity.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 4A-4D include various views of another example optoelectronic assembly that includes an optoelectronic device, a fiber stub, and a retention device;

FIGS. 7A-7C include various views of another example optoelectronic assembly that includes an optoelectronic device, a fiber stub, and a retention device;

FIGS. 8A-8C include various views of another example optoelectronic assembly that includes an optoelectronic device, a fiber stub, and a retention device;

DESCRIPTION OF EMBODIMENTS

Figure 1:
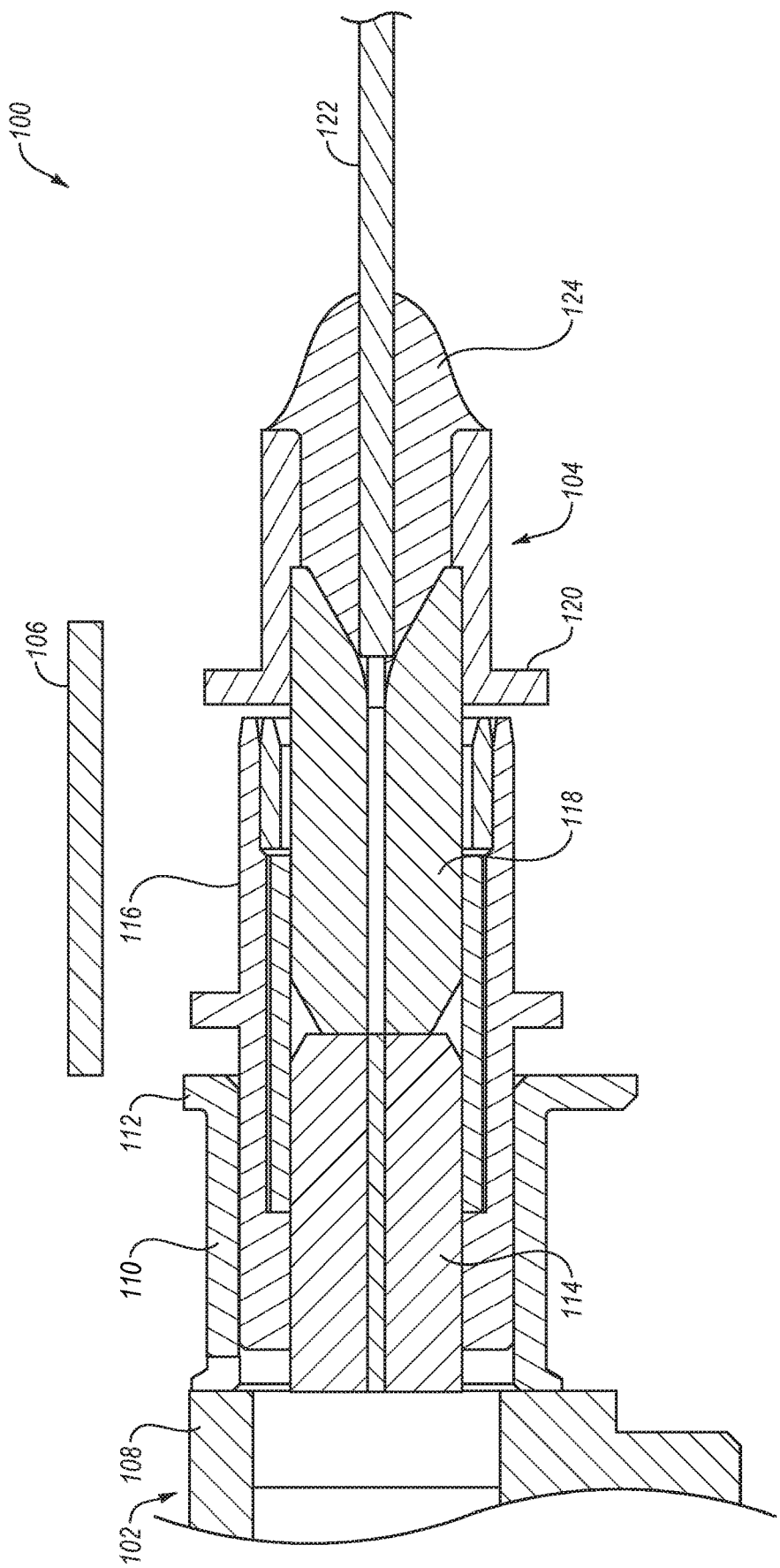
FIG. 1 includes a section view of an example optoelectronic assembly that includes an optoelectronic device, a fiber stub, and a retention device.

In the following detailed description, reference is made to drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In optical communication systems, there are optical interfaces between various optical components, such as between OSAs and optical fibers. For example, an OSA may transmit light to or receive light from an optical fiber via a fiber stub of the optical fiber that may be mated with a ferrule inside a receptacle of the OSA. However, if the optical fiber is not properly mated to the OSA, significant optical loss may occur across the optical interface between the OSA and the optical fiber. For example, if a fiber stub end of the optical fiber is not properly mated to an end of the ferrule, an air gap may be present between the fiber stub end and the end of the ferrule. The air gap may cause a portion of light from the OSA or the fiber to be reflected due to a change in refractive index from the optical fiber to the air in the air gap. The reflected light is included in the optical loss. As another example, if the fiber stub end is not properly mated to the end of the ferrule, an air gap between the fiber stub end and the ferrule may occur due to a mismatch in thermal expansion coefficients of the fiber stub end and the ferrule. As yet another example, an air gap between the fiber stub end and the ferrule may occur due to external forces such as shock or vibrations. The same or similar loss modes may affect fiber-to-fiber connections.

Some solutions to increase the likelihood of a stable optical connection, e.g., between a ferrule and a fiber stub, secure the ferrule and fiber stub together using an epoxy, solder, welding, or a press fit. However, the use of an epoxy to secure the ferrule and fiber stub together may be labor and equipment intensive and time consuming. For example, a fixture may be needed to hold the ferrule and fiber stub together during the application and/or curing of the epoxy. In addition, many epoxies require thermal or ultraviolet (UV) curing. Welding or soldering may also be labor and equipment intensive and time consuming. Welding or soldering may require expensive laser equipment and fixturing. In addition, press fitting the ferrule and fiber stub may be labor intensive and may damage the ferrule or the fiber stub. Furthermore, epoxied, soldered, welded, and press fit optical connection solutions are permanent and are not easily reworkable.

The present disclosure relates to a retention device configured to facilitate ease of assembly and/or disassembly and to reduce the cost of coupling an optical fiber to a module and to increase the likelihood of establishing and maintaining a stable optical connection. The principles of the present disclosure may also relate to other optoelectronic connections, such as fiber-to-fiber connections.

The retention device may be used to couple and hold a ferrule of an OSA and a fiber stub in close proximity to create an optical path and to maximize the transmission of light between the ferrule and the fiber stub. The optical path may be a path through which light may travel to and from an optoelectronic assembly through one or more mediums. In some embodiments, the retention device may include a mechanical device, such as a clip, clamp, collar, fastener, etc. configured to urge the ferrule and the fiber stub together. At least a portion of the retention device may be resiliently deformable, e.g., to accommodate thermal expansion of one or both of the ferrule or fiber stub and/or other components while still urging the ferrule and the fiber stub together.

The retention device may include a first end that may be configured to be positioned against a fiber stub flange of the fiber stub and a second end that may be configured to be positioned against a sleeve flange of a sleeve, e.g., of the OSA. The retention device may also be configured to apply inwardly directed opposing forces, with a first force applied to the fiber stub flange in a first direction and a second force applied to the sleeve flange in a second direction, opposite the first direction, such that the ferrule and the fiber stub may be urged together. Accordingly, the ferrule and the fiber stub may be located in close proximity or may be maintained in close proximity after assembly of the optoelectronic assembly. In the context of the present disclosure, two optical components may be said to be in close proximity if the distance (air gap) between them is less than 7% of the optical signal wavelength. For example, if the optical signal wavelength is 1310 nanometer (1E−9 meter), then a distance less than 91.7 nanometer may be said to be in close proximity. When two optical components are in close proximity, the optical insertion loss may be minimized to less than 0.1 decibel (dB). The retention device may be configured to locate or maintain the ferrule and the fiber stub in close proximity so as to reduce the likelihood of an air gap between an end of the ferrule and an end of the fiber stub and to maximize the stability of the connection between the corresponding optoelectronic device and the corresponding optical fiber.

The retention device may include various components in various configurations. The various configurations of the retention device may facilitate installation of the retention device to couple an optical fiber to an optoelectronic device and may be configured to apply inwardly directed opposing forces to the fiber stub flange and to the sleeve flange such that the ferrule and the fiber stub may be maintained in close proximity. The retention device may include one or more of a spring, an arm, a finger, a retention clamp, or other suitable structure(s) at various location(s) on the retention device. The structure(s) may facilitate the positioning of the retention device against the fiber stub flange and/or the sleeve flange and the application of force to the fiber stub flange and/or the sleeve flange.

FIG. 1 includes a section view of an example optoelectronic assembly 100 that includes an optoelectronic device 102, a fiber stub 104, and a retention device 106, arranged in accordance with at least one embodiment described herein. The fiber stub 104 may be included in or coupled to an optical fiber 122. In some embodiments, the optoelectronic device 102 may be coupled to the fiber stub 104, and thus the optical fiber 122, via the retention device 106.

Generally, the optoelectronic device 102 is a device that may convert electrical signals to optical signals and/or optical signals to electrical signals. In some embodiments, in general, the optoelectronic device 102 may include an OSA box 108, a sleeve 110; a ferrule 114, and a receptacle 116.

Generally, the OSA box 108 is a component that may house various components of an optoelectronic device. For example, the OSA box 108 may include a laser diode, a photo diode, a monitor photodiode, and/or other suitable components. The OSA box 108 may be any size or shape. The sleeve 110 and ferrule 114 may be fixedly coupled to the OSA box 108. The OSA box 108 may also interface with the receptacle 116 via the sleeve 110 and the ferrule 114. For example, the receptacle 116 may be removably or fixedly coupled to the OSA box 108 by interfacing with the sleeve 110 and the ferrule 114.

Generally, the sleeve 110 is a component that may receive a portion of the receptacle 116, align the receptacle 116 with the ferrule 114, and surround the portion of the receptacle 116. The sleeve 110 may be generally cylindrical in some embodiments. For example, the sleeve 110 may be a thin-walled cylinder. Additionally or alternatively, the sleeve 110 may be any size or shape. The sleeve 110 may include a sleeve flange 112 at a first end of the sleeve 110. A first face of the sleeve flange 112 may be arranged generally perpendicular to an axis running through the center of a cylinder portion of the sleeve 110. The sleeve 110 may be configured to be integrally formed with the OSA box 108. Additionally or alternatively, the sleeve 110 may be an independent component from the OSA box 108 that may be coupled to the OSA box 108 at a second end of the sleeve 110. The sleeve 110 may be configured to surround at least a portion of the ferrule 114.

Generally, the ferrule 114 may include ceramic, metal, or other suitable material that houses a stripped bare optical fiber. The ferrule 114 may be generally cylindrical in shape and may include a first end that is generally flat such that the ferrule 114 may interface with a generally flat end of a fiber stub end 118. The ferrule 114 may couple to the OSA box 108 and may interface with at least a portion of the receptacle 116. The sleeve 110, the ferrule 114, and the receptacle 116 may be referred to as a port assembly.

Generally, the receptacle 116 may interface with the sleeve 110 and the ferrule 114 and may align the fiber stub 104 with the ferrule 114. The receptacle 116 may be generally cylindrical in shape and may include a receptacle flange that may be located near a midsection of the receptacle 116. A first end of the receptacle 116 may be configured to receive the fiber stub end 118 of the fiber stub 104. A second end of the receptacle 116, opposite the first end may be configured to receive the ferrule 114. Additionally or alternatively, at least a portion of the receptacle, such as the second end of the receptacle 116 may be received within the sleeve 110.

Generally, the fiber stub 104 is an assembly that may be configured to couple the optical fiber 122 to the optoelectronic device 102. The fiber stub 104 may include the fiber stub end 118, a fiber stub flange 120, the optical fiber 122, an adhesive 124, and a stripped bare fiber that extends from the optical fiber 122 through the fiber stub end 118.

Generally, the fiber stub end 118 may be coupled to an end of a fiber optic cable (e.g., the optical fiber 122) to facilitate the coupling of the optical fiber 122 to the optoelectronic device 102 and may interface with and align with the ferrule 114 within the receptacle 116. The fiber stub end 118 may be generally cylindrical in shape and may include a first end that is generally flat such that the fiber stub end 118 may interface with the first end of the ferrule 114. The fiber stub end 118 may be constructed of ceramic or similar material. Additionally or alternatively, the fiber stub end 118 may be constructed of one or more other materials.

Generally, the optical fiber 122 may include glass fibers insulated inside a casing that may be used to carry light to and from an optoelectronic assembly. The casing of the fiber may be stripped off at an end of the optical fiber 122 to form the stripped bare fiber that may be inserted into a second end of the fiber stub end 118 and extend through the fiber stub end 118. The optical fiber 122 may be coupled to the fiber stub end 118 using the adhesive 124.

Generally, the retention device 106 may be used to couple the optoelectronic device 102 to the fiber stub 104. The retention device 106 may generally include a first end configured to be positioned against and/or interface with a fiber side of the fiber stub flange 120 of the fiber stub end 118 and a second end that may be configured to be positioned against and/or interface with an optoelectronic device side of a sleeve flange 112 of the sleeve 110. The fiber stub flange 120 or a radial flange against which the second end of the retention device 106 is positioned may include a retention device flange, or other flange, or other structure of an OSA or the OSA box 108. As used herein, "fiber side" and "optoelectronic device side" may refer to opposite directions, where "fiber side" may indicate a direction closer to or towards the optical fiber 122 and "optoelectronic device side" may indicate a direction closer to or towards the optoelectronic device 102.

The retention device 106 may include one or more of a spring, an arm, a finger, a retention clamp, other structure, or any combination thereof that may be configured to interface with various components of the optoelectronic device 102 and the fiber stub 104 to removably couple them together.

Modifications, additions, or omissions may be made to the optoelectronic assembly 100 without departing from the scope of the present disclosure. For example, although the retention device 106 has been described as coupling the optoelectronic device 102 and the fiber stub 104 together, other embodiments described herein may include retention devices that couple two fiber stubs together.

Figure 2A:
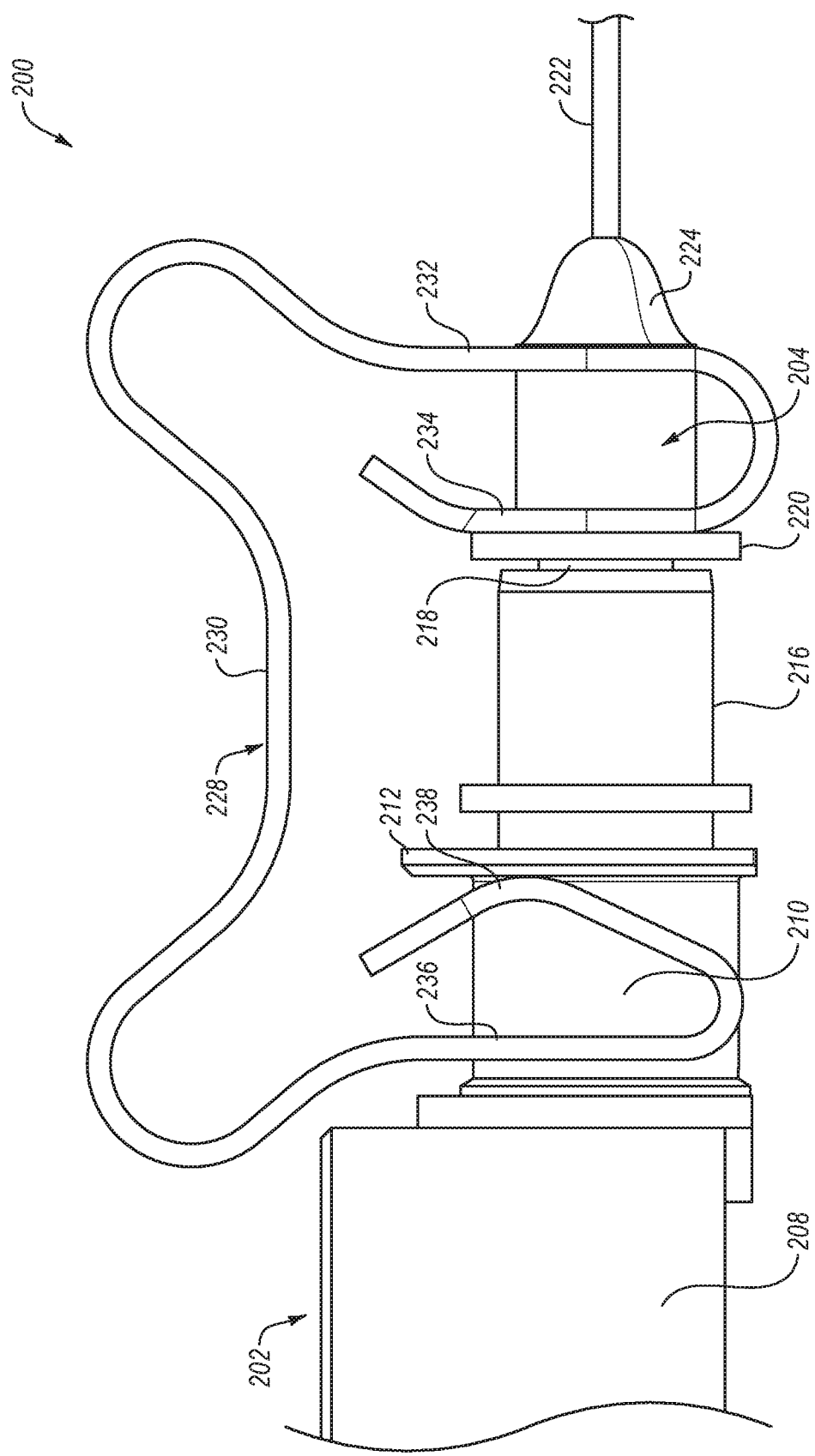
FIGS. 2A-2C include various views of another example optoelectronic assembly that includes an optoelectronic device, a fiber stub, and a retention device.
Figure 2B:
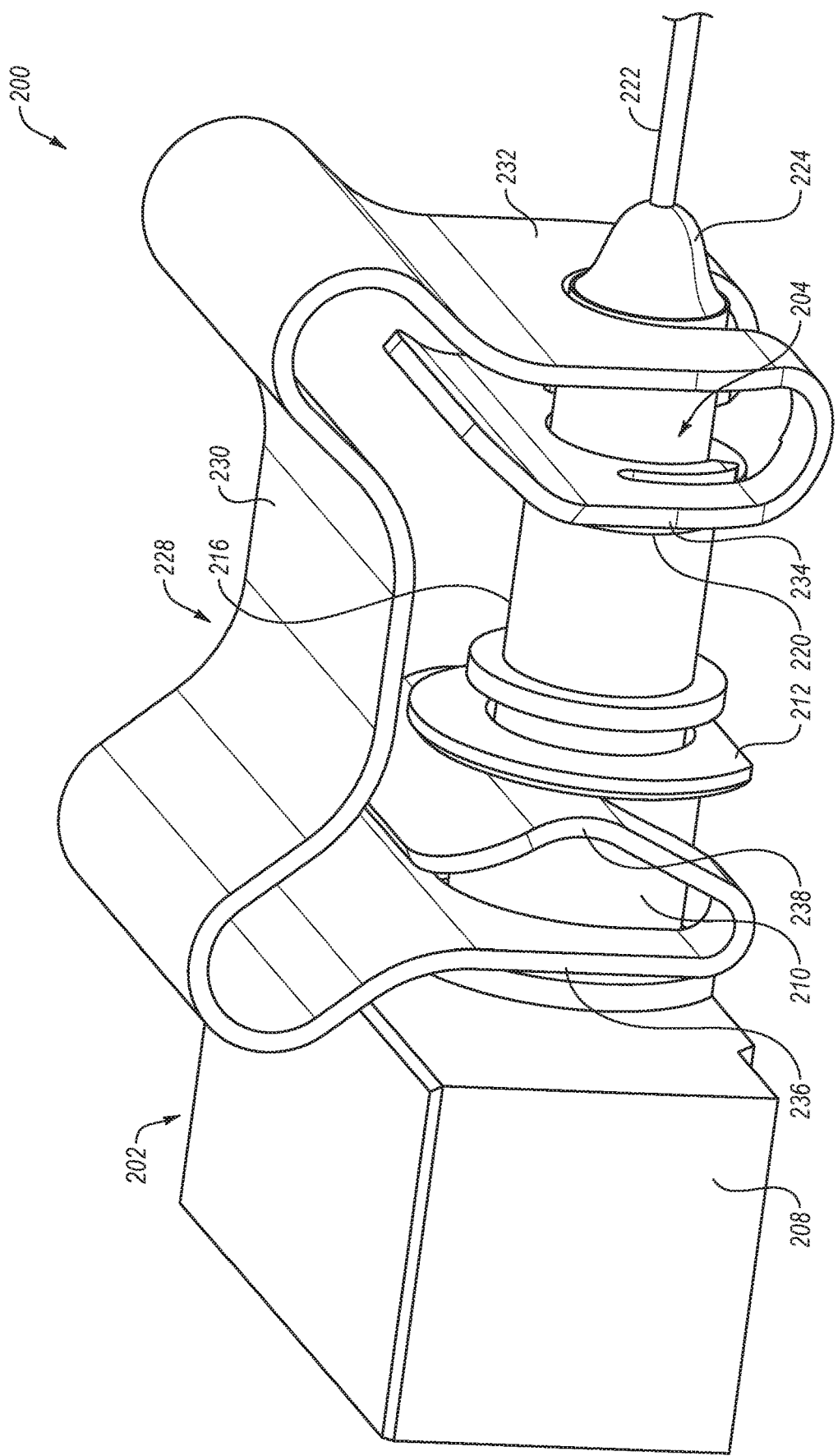
Figure 2C:
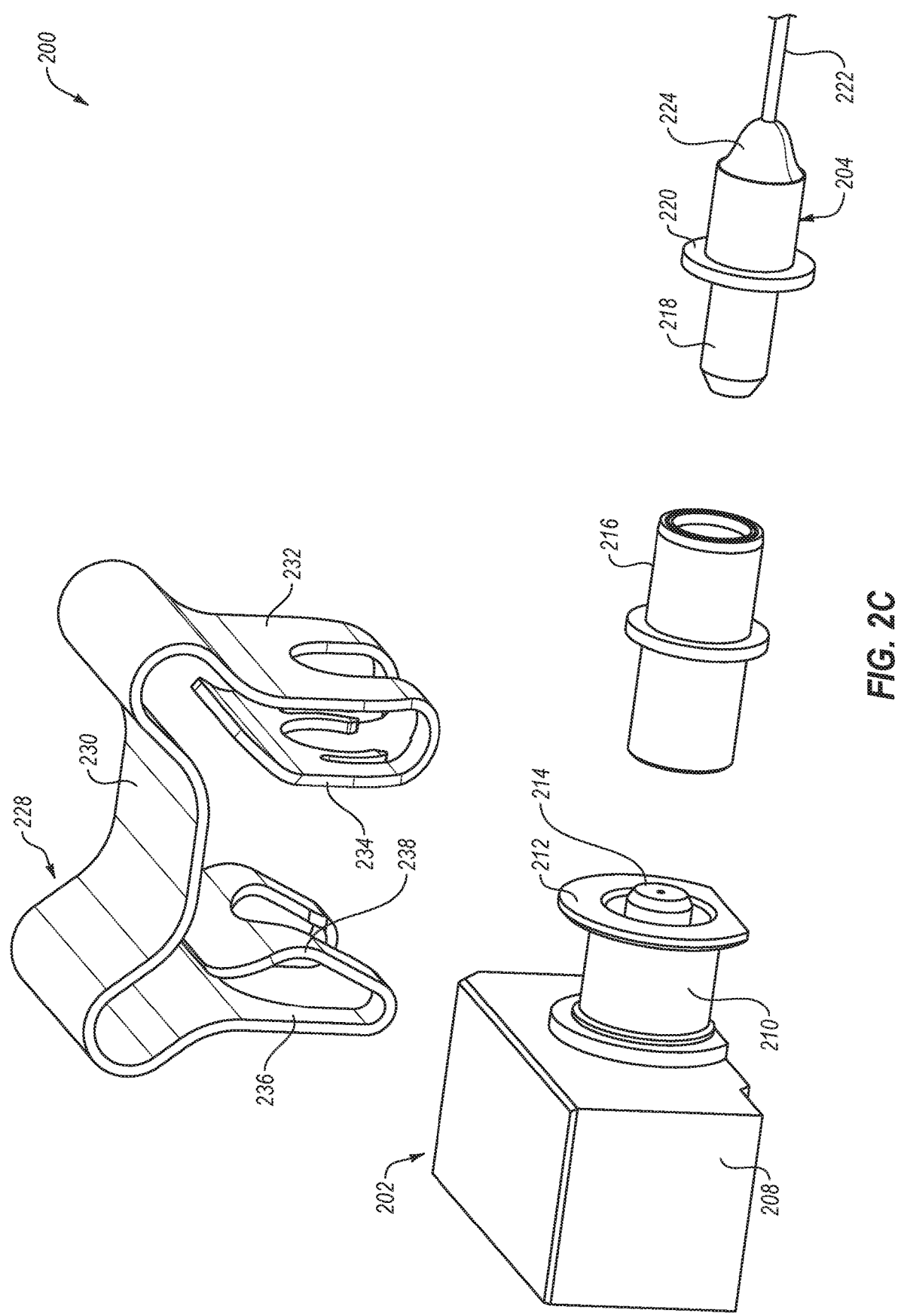

FIGS. 2A-2C include various views of another example optoelectronic assembly 200 that includes an optoelectronic device 202, a fiber stub 204, and a retention device 228, arranged in accordance with at least one embodiment described herein. FIG. 2A is a side view, FIG. 2B is a top fiber side perspective view, and FIG. 2C is an exploded top fiber side perspective view of the optoelectronic assembly 200. The optoelectronic device 202 may be coupled to the fiber stub 204 via the retention device 228.

Some components of the optoelectronic assembly 200 of FIGS. 2A-2C may be comparable or similar to the similarly named components of the optoelectronic assembly 100 of FIG. 1. For example, the optoelectronic device 202, the fiber stub 204, and the retention device 228 of FIGS. 2A-2C may be similar or comparable to, respectively, the optoelectronic device 102, the fiber stub 104, and the retention device 106 of FIG. 1.

The optoelectronic device 202 may include an OSA box 208, a sleeve 210; a ferrule 214, and a receptacle 216. The fiber stub 204 may include a fiber stub end 218 and a fiber stub flange 220 coupled to an optical fiber 222, an adhesive 224, and a stripped bare fiber that extends from the optical fiber 222 through the fiber stub end 218.

The retention device 228 may be configured to couple the fiber stub 204 to the optoelectronic device 202. The retention device 228 may include a first end configured to be positioned against a fiber side of the fiber stub flange 220 of the fiber stub 204 and a second end configured to be positioned against an optoelectronic device side of a sleeve flange 212 of the sleeve 210 of the optoelectronic assembly 200.

The retention device 228 may include a base 230, a first spring 232, a first collar 234, a second spring 236, and a second collar 238. The base 230 may be configured to be substantially parallel to an optical path through the optoelectronic device 202 and the fiber stub 204. The first spring 232 may extend generally perpendicular from a first side of the base 230.

The first spring 232 may wrap around and extend into the first collar 234. A portion of the first collar 234 may extend substantially parallel to a portion of the first spring 232. The first collar 234 may be configured to surround a portion of the fiber stub 204 and may interface with and/or contact the fiber stub 204 at one or more locations. For example, the first collar 234 may be positioned against the fiber side of the fiber stub flange 220. The first spring 232 and the first collar 234 may be configured to apply a first force to the fiber side of the fiber stub flange 220 toward the optoelectronic device 202. For example, the first spring 232 may apply the first force to the fiber stub 204 such that the fiber stub 204 is forced toward the optoelectronic device 202 and the fiber stub end 218 and the ferrule 214 are in close proximity and may be maintained in close proximity.

The second spring 236 may extend generally perpendicular from a second side of the base 230. The second spring 236 may wrap around and extend into the second collar 238. A portion of the second collar 238 may extend substantially parallel to a portion of the second spring 236. The second collar 238 may be configured to surround a portion of the sleeve 210 and may interface with and/or contact the sleeve 210 at one or more locations. For example, the second collar 238 may be positioned against the optoelectronic device side of the sleeve flange 212. The second spring 236 and the second collar 238 may be configured to apply a second force to the optoelectronic device side of the sleeve flange 212 toward the fiber stub 204. For example, the second spring 236 may apply the second force to the optoelectronic device 202 such that the optoelectronic device 202 is forced toward the fiber stub 204 and the fiber stub end 218 and the ferrule 214 are in close proximity and may be maintained in close proximity. The base 230 may function as a third spring such that the first force and the second force applied by the first spring 232 and the second spring 236 are increased.

Modifications, additions, or omissions may be made to the optoelectronic assembly 200 without departing from the scope of the present disclosure. For example, although the retention device 228 has been described as coupling the optoelectronic device 202 and the fiber stub 204 together, other embodiments described herein may include retention devices that couple two fiber stubs together.

Figure 3A:
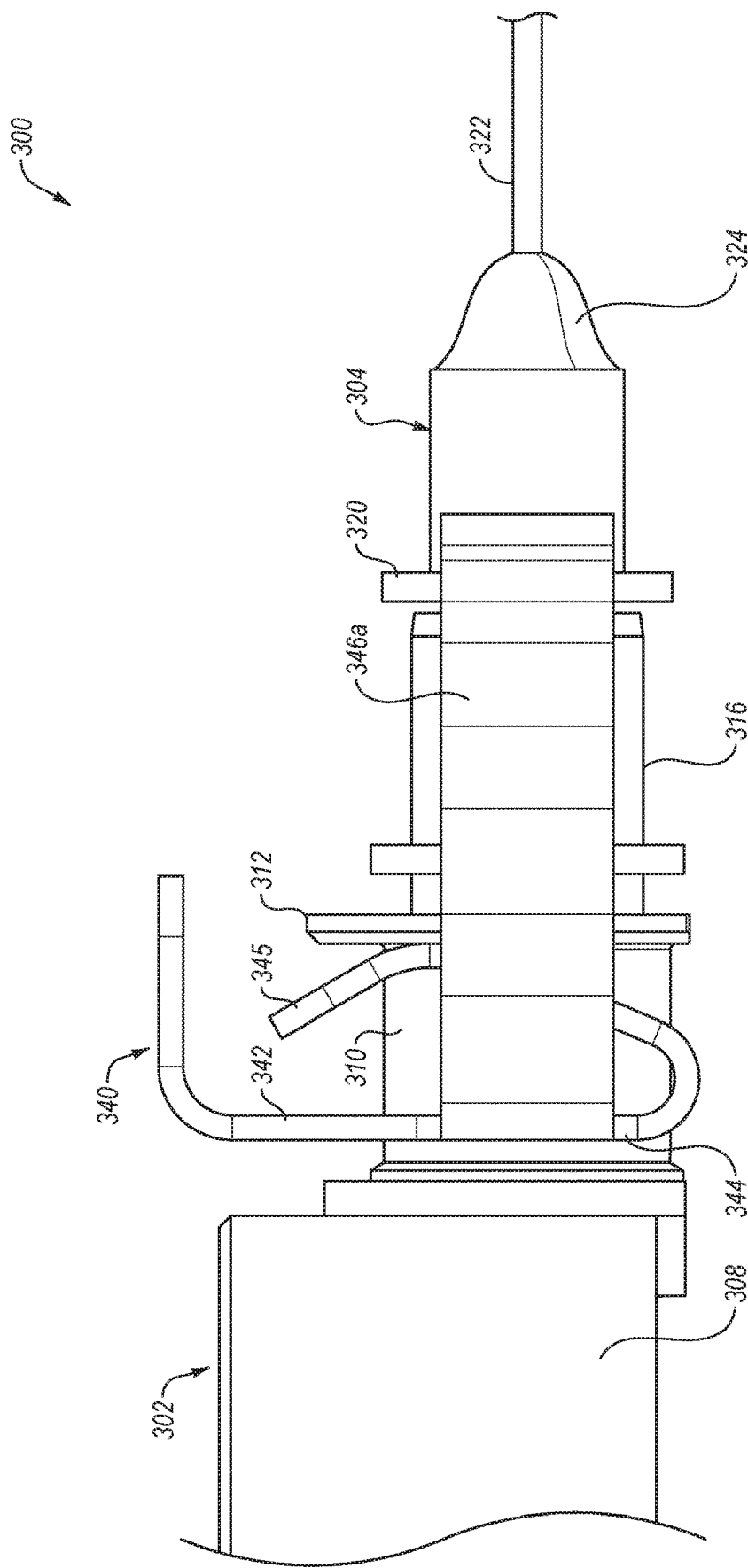
FIGS. 3A-3C include various views of another example optoelectronic assembly that includes an optoelectronic device, a fiber stub, and a retention device.
Figure 3B:
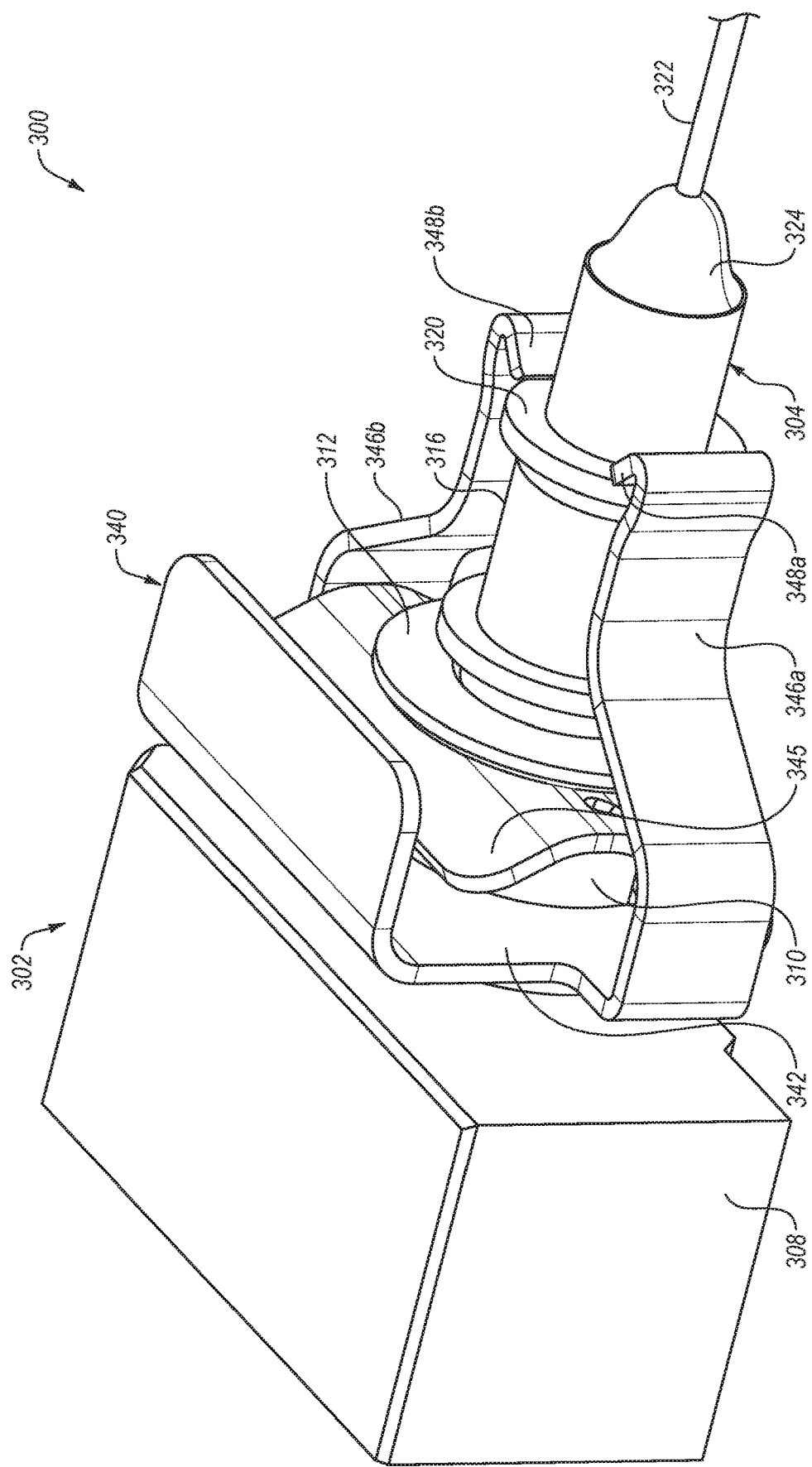
Figure 3C:
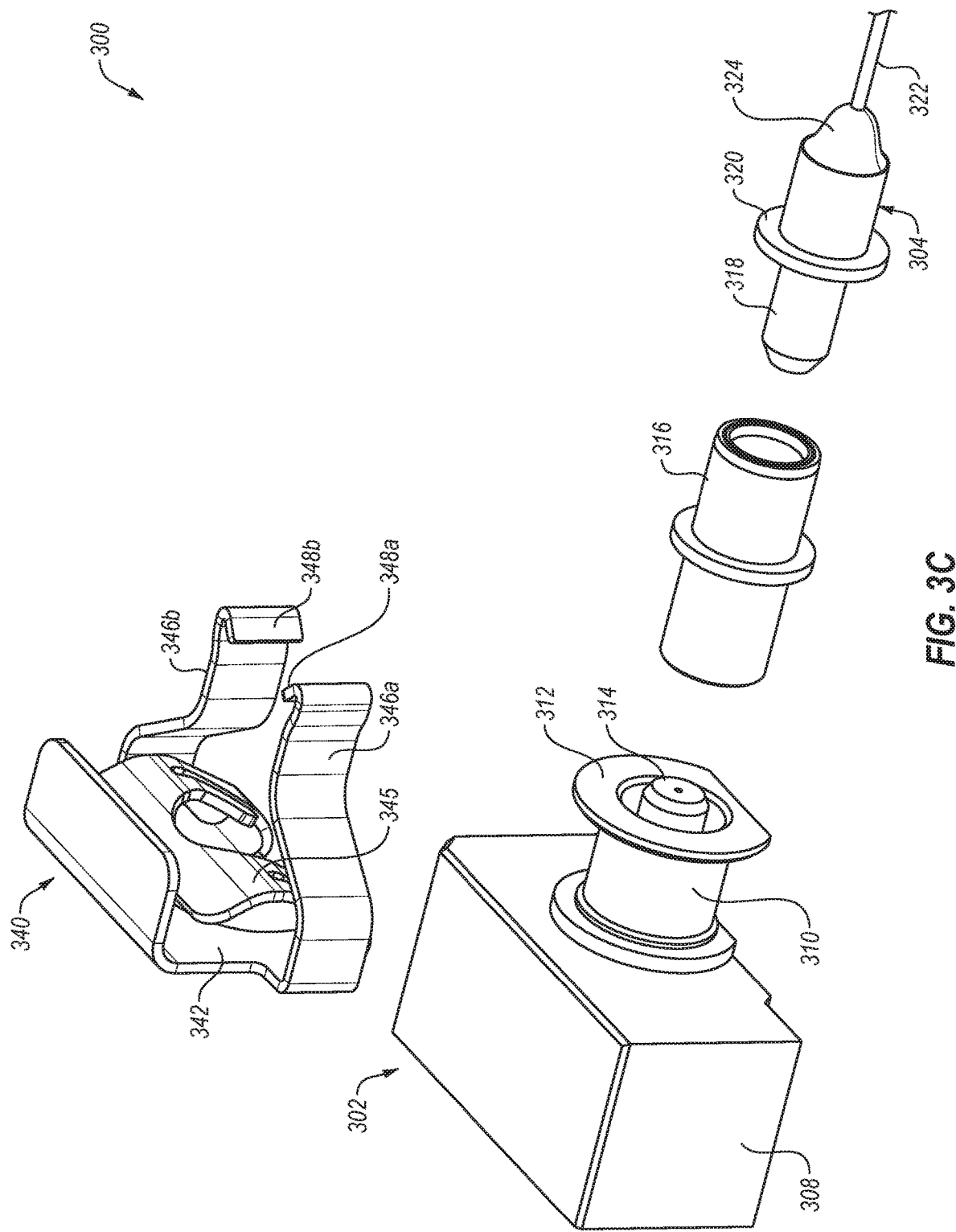

FIGS. 3A-3C include various views of another example optoelectronic assembly 300 that includes an optoelectronic device 302, a fiber stub 304, and a retention device 340, arranged in accordance with at least one embodiment described herein. FIG. 3A is a side view, FIG. 3B is a top fiber side perspective view, and FIG. 3C is an exploded top fiber side perspective view of the optoelectronic assembly 300. The optoelectronic device 302 may be coupled to the fiber stub 304 via the retention device 340.

Some components of the optoelectronic assembly 300 of FIGS. 3A-3C may be comparable or similar to the similarly named components of the optoelectronic assembly 100 of FIG. 1. For example, the optoelectronic device 302, the fiber stub 304, and the retention device 340 of FIGS. 3A-3C may be similar or comparable to, respectively, the optoelectronic device 102, the fiber stub 104, and the retention device 106 of FIG. 1.

The optoelectronic device 302 may include an OSA box 308, a sleeve 310; a ferrule 314, and a receptacle 316. The fiber stub 304 may include a fiber stub end 318 and a fiber stub flange 320 coupled to an optical fiber 322, an adhesive 324, and a stripped bare fiber that extends from the optical fiber 322 through the fiber stub end 318.

The retention device 340 may be configured to couple the fiber stub 304 to the optoelectronic device 302. The retention device 340 may include a first end configured to be positioned against a fiber side of the fiber stub flange 320 of the fiber stub 304 and a second end that may be configured to be positioned against an optoelectronic device side of a sleeve flange 312 of the sleeve 310 of the optoelectronic assembly 300.

The retention device 340 may include a base 342, a first spring 344, a first collar 345, first and second arms 346a and 346b, and first and second finger 348a and 348b. The base 342 may be configured to be arranged substantially perpendicular to an optical path through the optoelectronic device 302 and the fiber stub 304. The first spring 344 may wrap around and extend into the first collar 345. The first spring 344 may extend from a first side of the base 342 at least initially generally parallel to a portion of the base 342. A portion of the first collar 345 may extend substantially parallel to a portion of the first spring 344. The first collar 345 may be configured to surround a portion of the sleeve 310 and may interface with the sleeve 310 at one or more locations. For example, the first collar 345 may be positioned against the optoelectronic device side of the sleeve flange 312. The first spring 344 and the first collar 345 may be configured to apply a first force to the optoelectronic device side of the sleeve flange 312. For example, the first spring 344 and the first collar 345 may apply the first force to the optoelectronic device side of the sleeve flange 312 such that the optoelectronic device 302 is forced toward and/or maintained against the fiber stub 304 and the fiber stub end 318 and the ferrule 314 are in close proximity and may be maintained in close proximity.

The first and second arms 346a and 346b may extend generally perpendicular from the base 342, the first arm 346a opposite the base 342 from the second arm 346b. More particularly, the first and second arms 346a and 346b may extend generally perpendicular from the base 342 in a side view (FIG. 3A), with potentially some curvature and/or inward directionality when viewed from above/below. The first and second arms 346a and 346b may be curved such that the first and second arms 346a and 346b approach each other and/or the optical path further from the base 342. The first arm 346a may include a first finger 348a that extends, e.g., inward, from a first end of the first arm 346a and is configured to engage the fiber side of the fiber stub flange 320. The second arm 346b may include a second finger 348b that extends, e.g., inward, from a first end of the second arm 346b and is configured to engage the fiber side of the fiber stub flange 320. The first and second arms 346a and 346b and the first and second fingers 348a and 348b may be configured to apply a second force, opposite the first force, to the fiber side of the fiber stub flange 320. The base 342 may function as a third spring such that the first force applied by the first spring 344 and the second force applied by the first and second arms 346a and 346b are increased.

Modifications, additions, or omissions may be made to the optoelectronic assembly 300 without departing from the scope of the present disclosure. For example, although the retention device 340 has been described as coupling the optoelectronic device 302 and the fiber stub 304 together, other embodiments described herein may include retention devices that couple two fiber stubs together.

Figure 4A:
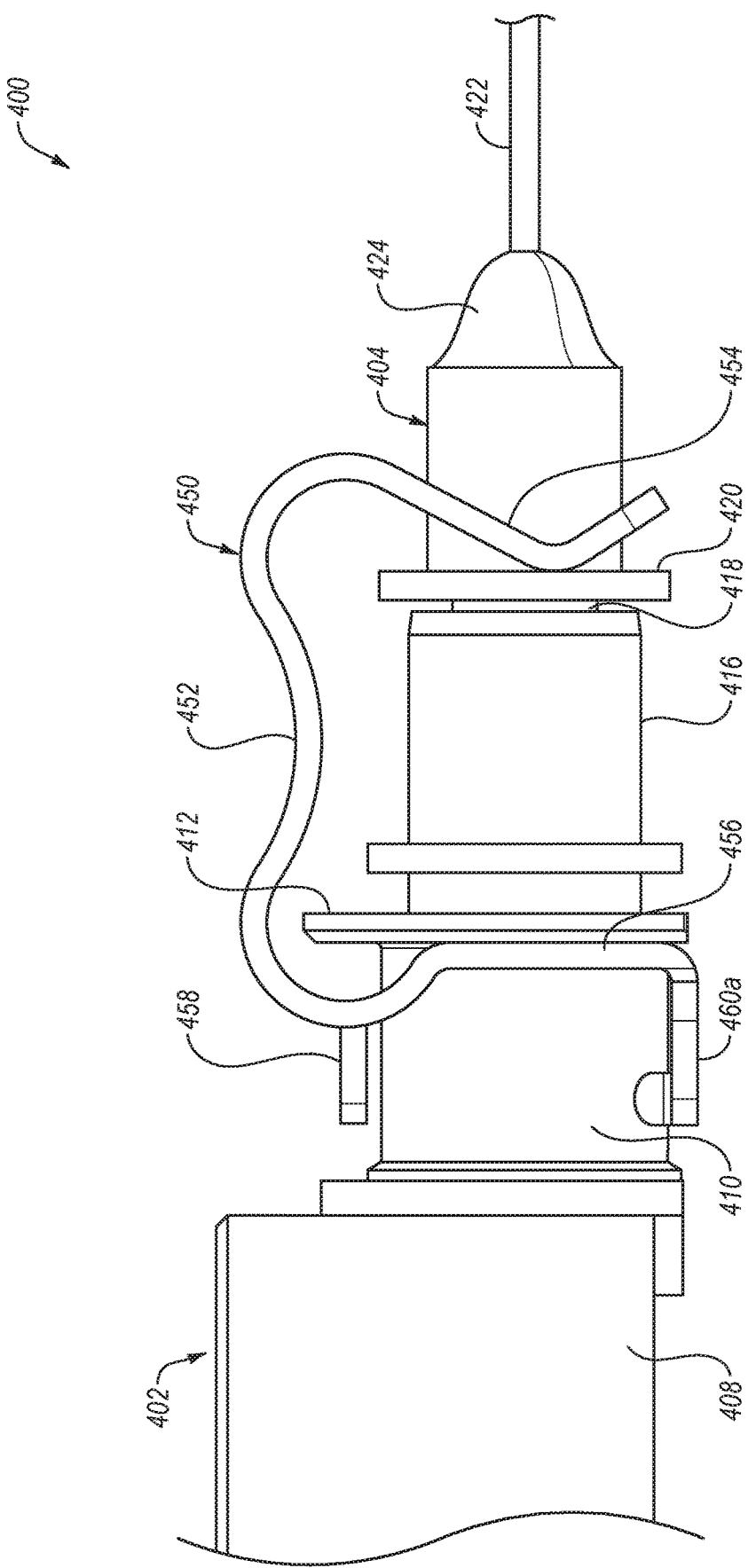
Figure 4B:
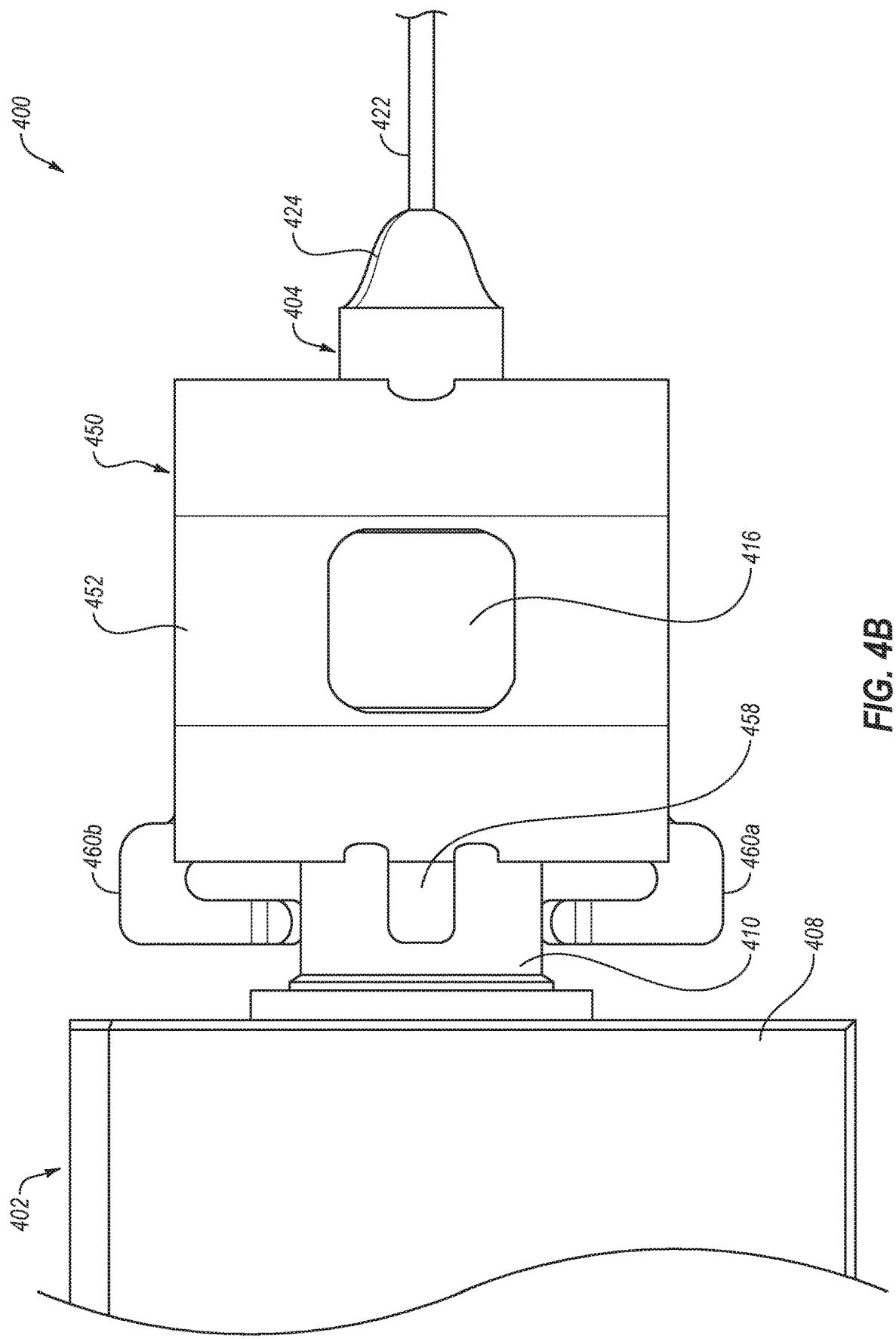
Figure 4C:
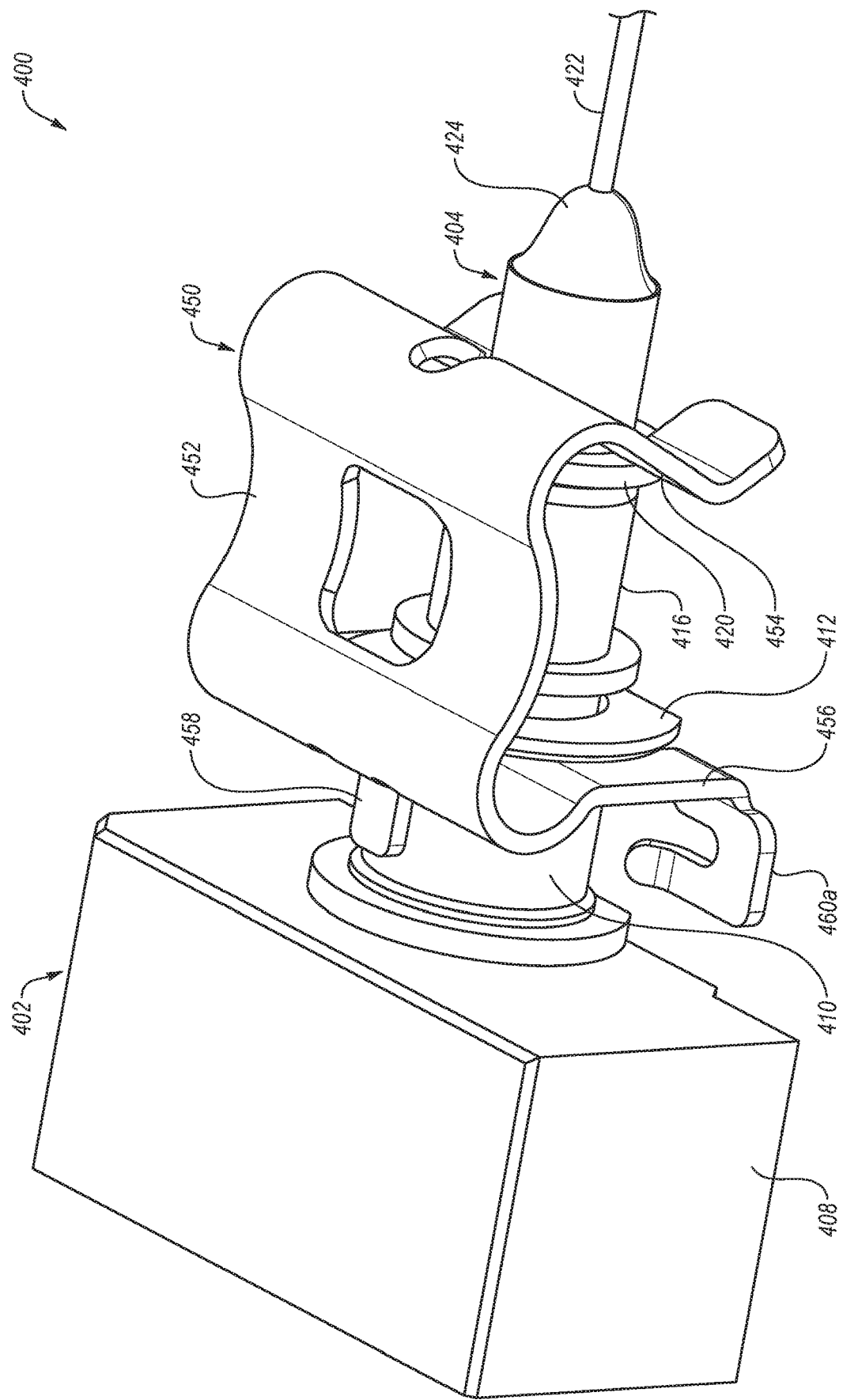

FIGS. 4A-4D include various views of another example optoelectronic assembly 400 that includes an optoelectronic device 402, a fiber stub 404, and a retention device 450, arranged in accordance with at least one embodiment described herein. FIG. 4A is a side view, FIG. 4B is a top view, FIG. 4C is a top fiber side perspective view, and FIG. 4D is an exploded top fiber side perspective view of the optoelectronic assembly 400. The optoelectronic device 402 may be coupled to the fiber stub 404 via the retention device 450.

Some components of the optoelectronic assembly 400 of FIGS. 4A-4D may be comparable or similar to the similarly named components of the optoelectronic assembly 100 of FIG. 1. For example, the optoelectronic device 402, the fiber stub 404, and the retention device 450 of FIGS. 4A-4D may be similar or comparable to, respectively, the optoelectronic device 102, the fiber stub 104, and the retention device 106 of FIG. 1.

The optoelectronic device 402 may include an OSA box 408, a sleeve 410; a ferrule 414, and a receptacle 416. The fiber stub 404 may include a fiber stub end 418 and a fiber stub flange 420 coupled to an optical fiber 422, an adhesive 424, and a stripped bare fiber that extends from the optical fiber 422 through the fiber stub end 418.

The retention device 450 may be configured to couple the fiber stub 404 to the optoelectronic device 402. The retention device 450 may include a first end configured to be positioned against a fiber side of the fiber stub flange 420 of the fiber stub 404 and a second end configured to be positioned against an optoelectronic device side of a sleeve flange 412 of the sleeve 410 of the optoelectronic assembly 400.

The retention device 450 may include a base 452, a first spring 454, a second spring 456, a tab 458, and first and second fingers 460a and 460b. The base 452 may include a curved portion. A center of the curved portion may be generally concave and may define a void. The void may be generally rectangular in shape when viewed from above and with curved corners. Additionally or alternatively, the void may be any shape or configuration. A first portion of the curved portion of the base 452 may be configured to be substantially parallel to an optical path through the optoelectronic device 402 and the fiber stub 404.

The first spring 454 may extend away from a first end of the base 452 and toward the fiber side of the fiber stub flange 420. The first spring 454 may be configured to surround a portion of the fiber stub 404 and may interface with and/or contact the fiber stub 404 at one or more locations. For example, the first spring 454 may be positioned against the fiber side of the fiber stub flange 420. The first spring 454 may be configured to apply a first force to the fiber side of the fiber stub flange 420. For example, the first spring 454 may apply the first force to the fiber stub 404 such that the fiber stub 404 is forced toward and/or maintained against the optoelectronic device 402 and the fiber stub end 418 and a ferrule 414 are in close proximity and may be maintained in close proximity.

The second spring 456 may extend away from a second end of the base 452 and toward the optoelectronic device side of a sleeve flange 412. Alternatively or additionally, the second spring 456 may extend generally perpendicular from a second side of the base 452. The second spring 456 may be configured to surround a portion of the sleeve 410 and may interface with and/or contact the sleeve 410 at one or more locations. For example, the second spring 456 may be positioned against the optoelectronic device side of the sleeve flange 412. The second spring 456 may be configured to apply a second force to the optoelectronic device side of the sleeve flange 412. For example, the second spring 456 may apply the second force to the optoelectronic device of the sleeve flange 412 such that the optoelectronic device 402 is forced toward and/or maintained against the fiber stub 404 and the fiber stub end 418 and a ferrule 414 are in close proximity and may be maintained in close proximity. The curved portion of the base 452 and the void of the base 452 may decrease the first force applied by the first spring 454 to the fiber side of the fiber stub flange 420 and the second force applied by the second spring 456 to the optoelectronic device side of the sleeve flange 412 and make the retention device 450 more flexible for ease of installation and removal.

A tab 458 may extend away from a second end of the base 452 and above a first portion of the sleeve 410. The tab 458 may be configured to interface with and/or contact the sleeve 410 during installation and/or removal of the retention device 450. The tab 458 may also be configured to maintain the retention device 450 around the sleeve 410 and/or stabilize the retention device 450 during installation and/or removal of the retention device 450.

The first finger 460a may extend away from a first end of the second spring 456 and may extend toward a second portion of the sleeve 410. The first finger 460a may interface with and/or contact the sleeve 410 to maintain the retention device 450 around the sleeve 410. The second finger 460b may extend away from a second end of the second spring 456 and may extend toward a third portion of the sleeve 410, opposite the second portion of the sleeve 410. The second finger 460b may interface with and/or contact the sleeve 410 to maintain the retention device 450 around the sleeve 410. A distance between an innermost end of the first finger 460a and an innermost end of the second finger 460b may be shorter than an outer diameter of the sleeve 410. Accordingly, the first and second fingers 460a, 460b may include a resiliently deformable material to flex or otherwise resiliently deform around the sleeve 410 during installation. Alternatively or additionally, after being fully installed around the sleeve 410, a line between ends of the first and second fingers 460a, 460b may be secant to a circular cross-section of the sleeve 410 through which the line passes.

Modifications, additions, or omissions may be made to the optoelectronic assembly 400 without departing from the scope of the present disclosure. For example, although the retention device 450 has been described as coupling the optoelectronic device 402 and the fiber stub 404 together, other embodiments described herein may include retention devices that couple two fiber stubs together.

Figure 5A:
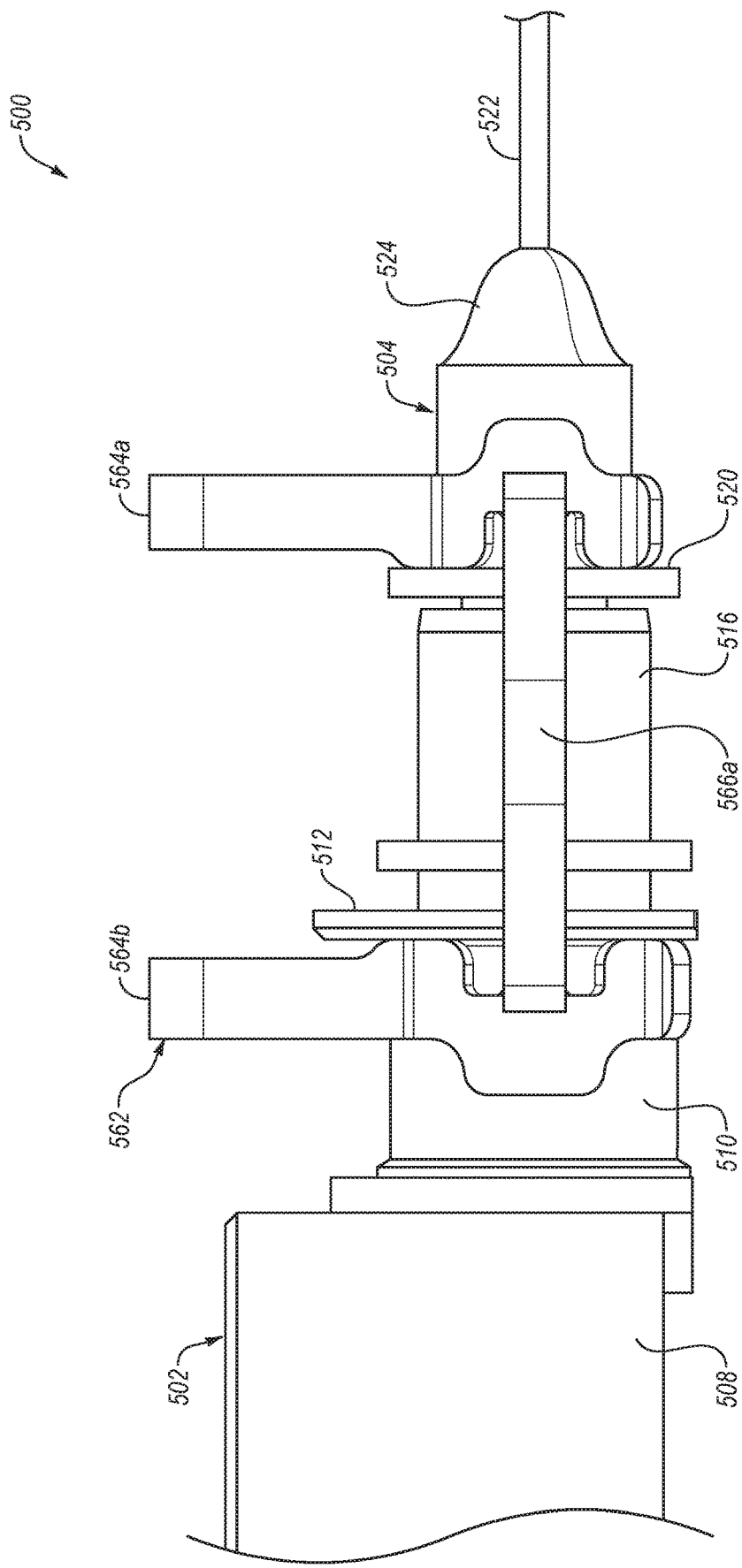
FIGS. 5A-5C include various views of another example optoelectronic assembly that includes an optoelectronic device, a fiber stub, and a retention device.
Figure 5B:
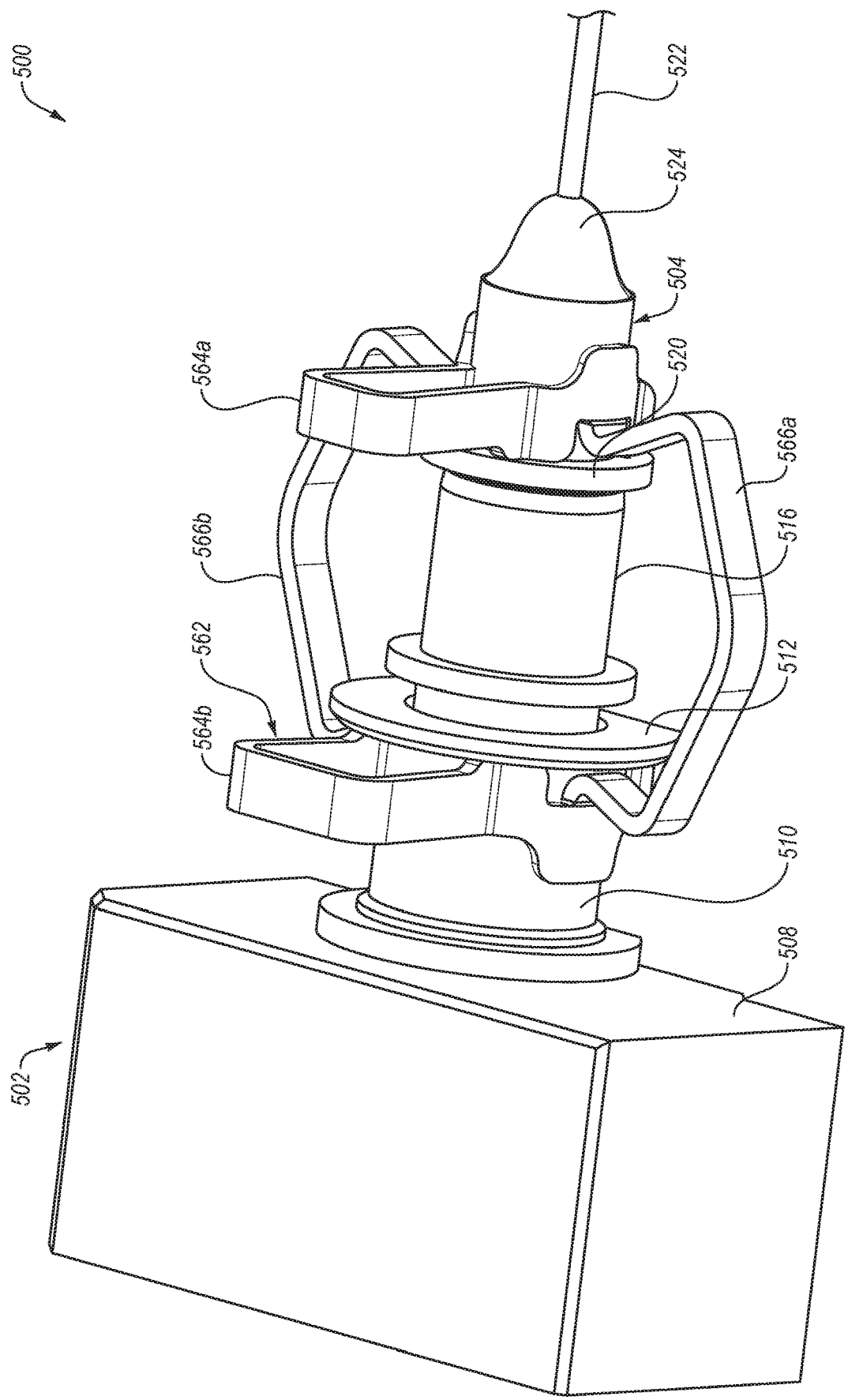
Figure 5C:
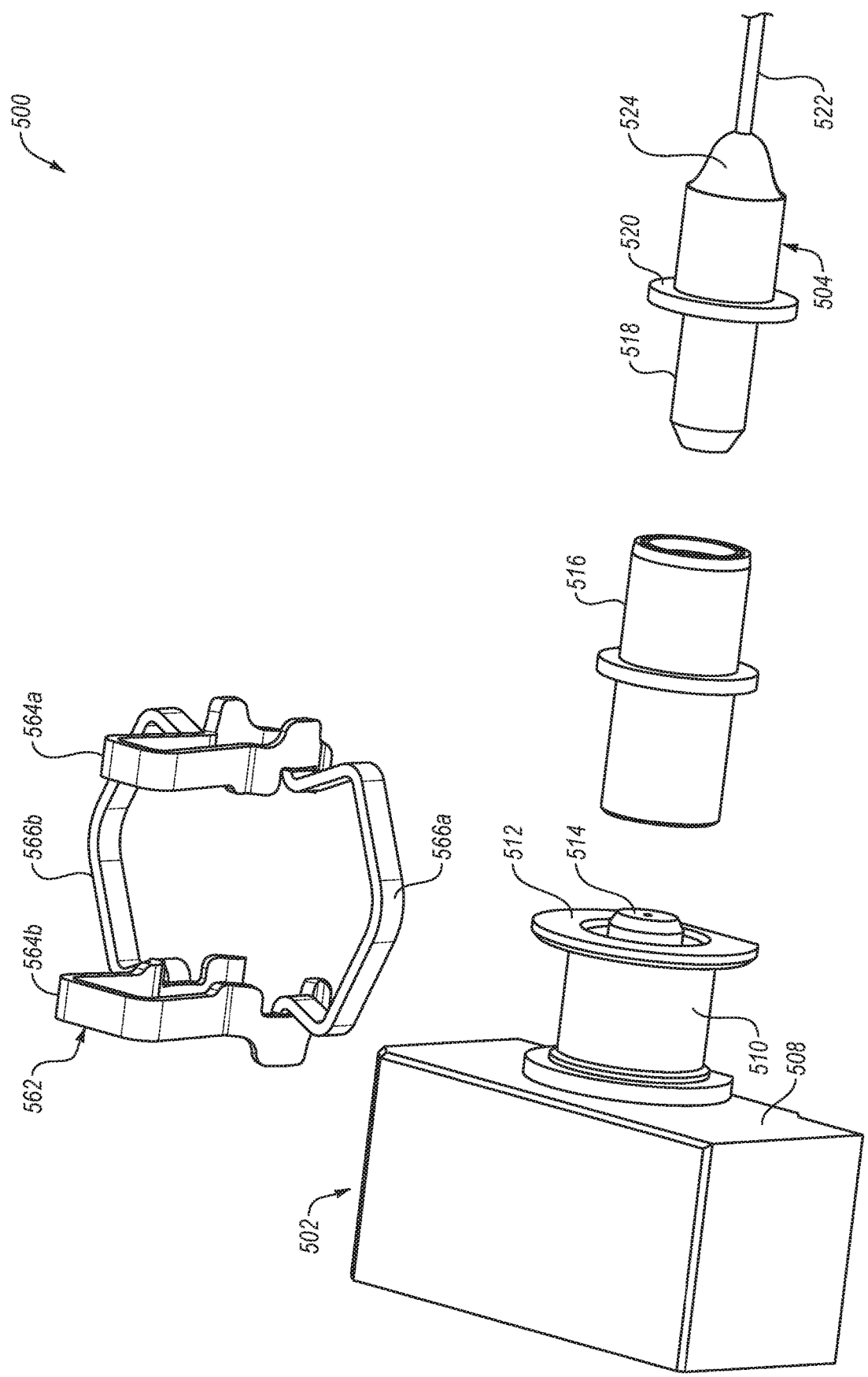

FIGS. 5A-5C include various views of another example optoelectronic assembly 500 that includes an optoelectronic device 502, a fiber stub 504, and a retention device 562, arranged in accordance with at least one embodiment described herein. FIG. 5A is a side view, FIG. 5B is a top fiber side perspective view, and FIG. 5C is an exploded top fiber side perspective view. The optoelectronic device 502 may be coupled to the fiber stub 504 via the retention device 562.

Some components of the optoelectronic assembly 500 of FIGS. 5A-5C may be comparable or similar to the similarly named components of the optoelectronic assembly 100 of FIG. 1. For example, the optoelectronic device 502, the fiber stub 504, and the retention device 562 of FIGS. 5A-5C may be similar or comparable to, respectively, the optoelectronic device 102, the fiber stub 104, and the retention device 106 of FIG. 1.

The optoelectronic device 502 may include an OSA box 508, a sleeve 510; a ferrule 514, and a receptacle 516. The fiber stub 504 may include a fiber stub end 518 and a fiber stub flange 520 coupled to an optical fiber 522, an adhesive 524, and a stripped bare fiber that extends from the optical fiber 522 through the fiber stub end 518.

The retention device 562 may be configured to couple the fiber stub 504 to the optoelectronic device 502. The retention device 562 may include a first end configured to be positioned against a fiber side of the fiber stub flange 520 of the fiber stub 504 and a second end configured to be positioned against an optoelectronic device side of a sleeve flange 512 of the sleeve 510 of the optoelectronic assembly 500.

The retention device 562 may include a first retention clamp 564a, a second retention clamp 564b, a first arm 566a, and a second arm 566b. The first retention clamp 564a may be configured to be arranged substantially perpendicular to an optical path through the optoelectronic device 502 and the fiber stub 504. The first retention clamp 564a may be configured to surround a portion of the fiber stub 504 and may interface with and/or contact the fiber stub 504 at one or more locations. For example, the first retention clamp 564a may be positioned against the fiber side of the fiber stub flange 520. The first retention clamp 564a may be configured to form a first collar around the fiber stub 504, to interface with a first side of the fiber stub 504, to interface with a second side of the fiber stub 504, opposite the first side of the fiber stub 504, and/or to apply a first force to the fiber side of the fiber stub flange 520. For example, the first retention clamp 564a may apply the first force to the fiber stub 504 such that the fiber stub 504 is forced toward and/or maintained against the optoelectronic device 502 and the fiber stub end 518 and the ferrule 514 are in close proximity and may be maintained in close proximity.

The second retention clamp 564b may be configured to be arranged substantially perpendicular to the optical path through the optoelectronic device 502 and the fiber stub 504. The second retention clamp 564b may be configured to surround a portion of the sleeve 510 and may interface with and/or contact the sleeve 510 at one or more locations. For example, the second retention clamp 564b may be positioned against the optoelectronic device side of the sleeve flange 512. The second retention clamp 564b may be configured to form a second collar around the sleeve 510, to interface with a first side of the sleeve 510, to interface with a second side of the sleeve 510, opposite the first side of the sleeve 510, and/or to apply a second force to the optoelectronic device side of the sleeve flange 512. For example, the second retention clamp 564b may apply the second force to the optoelectronic device side of the sleeve flange 512 such that the optoelectronic device 502 is forced toward and/or maintained against the fiber stub 504 and the fiber stub end 518 and the ferrule 514 are in close proximity and may be maintained in close proximity.

The first arm 566a may extend away from the first side of the fiber stub 504 and the first retention clamp 564a, around a first portion of the fiber stub flange 520, around a first portion of the sleeve flange 512, and toward the sleeve 510 and a first side of the second retention clamp 564b. The second arm 566b may extend away from a second side of the fiber stub 504 that is opposite the first side of the fiber stub 504 and away from the first retention clamp 564a, around a second portion of the fiber stub flange 520, around a second portion of the sleeve flange 512, and toward the sleeve 510 and a second side of the second retention clamp 564b.

The first and second arms 566a and 566b may be configured to apply inwardly directed opposing forces to the optoelectronic device side of the sleeve flange 512 and the fiber side of the fiber stub flange 520 through the first and second retention clamps 564a, 564b and to maintain the ferrule 514 and the fiber stub end 518 in close proximity.

Modifications, additions, or omissions may be made to the optoelectronic assembly 500 without departing from the scope of the present disclosure. For example, although the retention device 562 has been described as coupling the optoelectronic device 502 and the fiber stub 504 together, other embodiments described herein may include retention devices that couple two fiber stubs together.

Figure 6A:
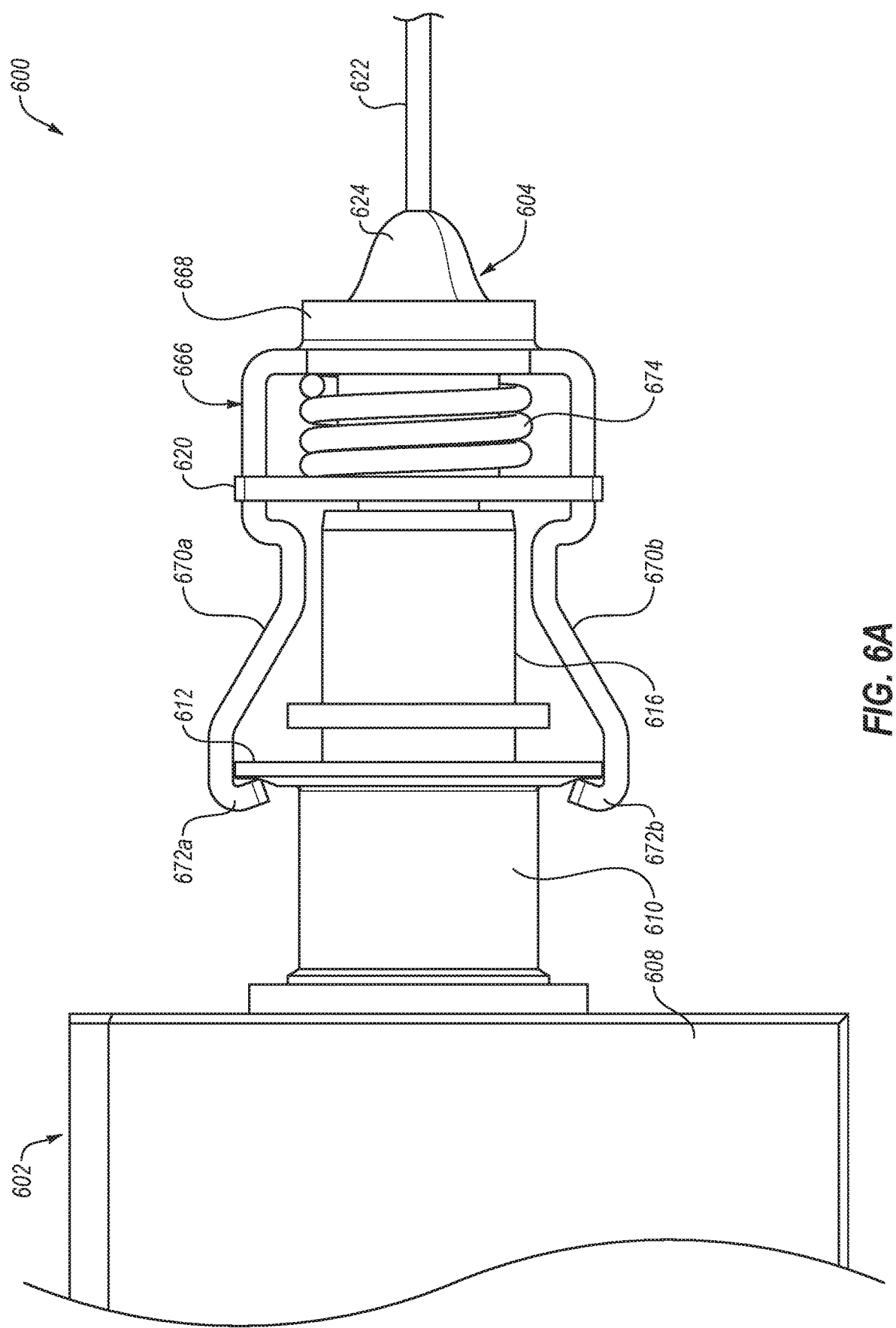
FIGS. 6A-6C include various views of another example optoelectronic assembly that includes an optoelectronic device, a fiber stub, and a retention device.
Figure 6B:
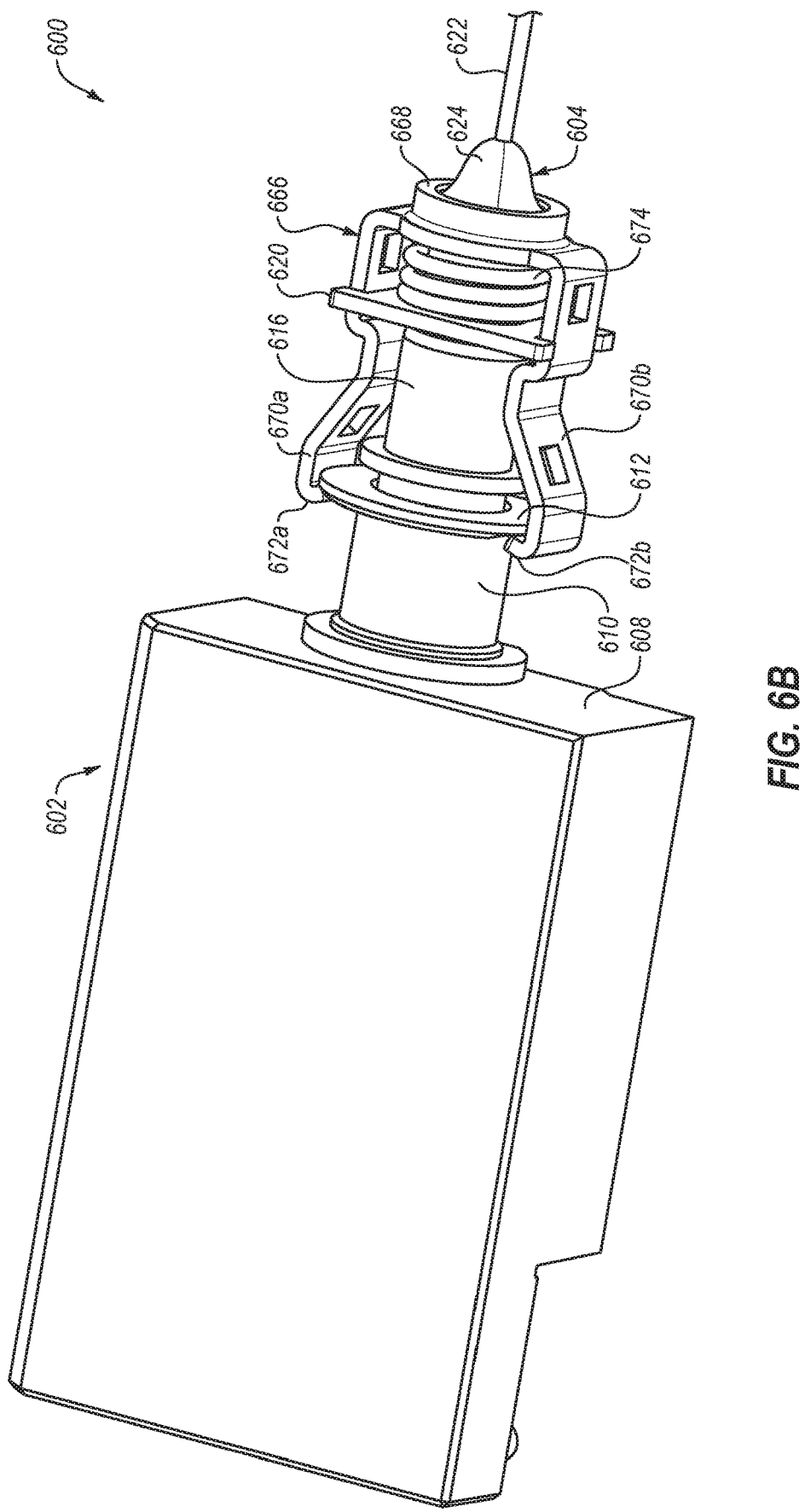
Figure 6C:
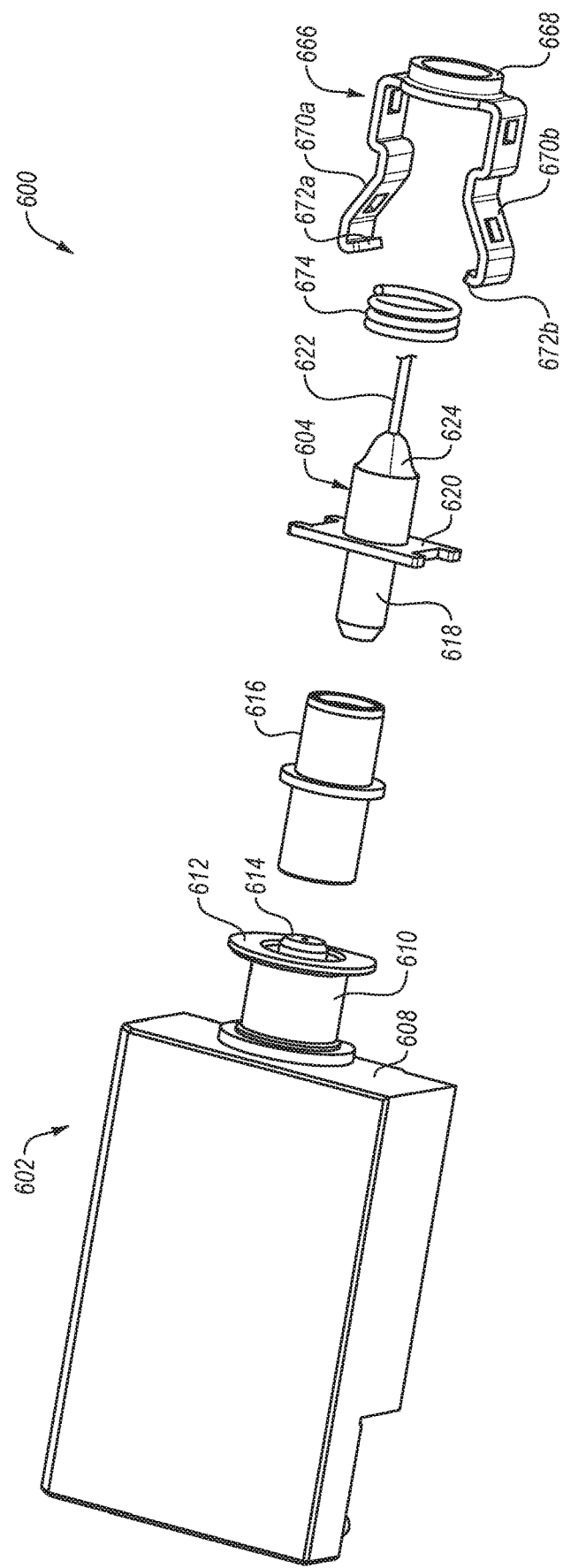

FIGS. 6A-6C include various views of another example optoelectronic assembly 600 that includes an optoelectronic device 602, a fiber stub 604, and a retention device 666, arranged in accordance with at least one embodiment described herein. FIG. 6A is a side view, FIG. 6B is a top fiber side perspective view, and FIG. 6C is an exploded top fiber side perspective view. The optoelectronic device 602 may be coupled to the fiber stub 604 via the retention device 666.

Some components of the optoelectronic assembly 600 of FIGS. 6A-6C may be comparable or similar to the similarly named components of the optoelectronic assembly 100 of FIG. 1. For example, the optoelectronic device 602, the fiber stub 604, and the retention device 666 of FIGS. 6A-6C may be similar or comparable to, respectively, the optoelectronic device 102, the fiber stub 104, and the retention device 106 of FIG. 1.

The optoelectronic device 602 may include an OSA box 608, a sleeve 610; a ferrule 614, and a receptacle 616. The fiber stub 604 may include a fiber stub end 618 and a fiber stub flange 620 coupled to an optical fiber 622, an adhesive 624, and a stripped bare fiber that extends from the optical fiber 622 through the fiber stub end 618.

The retention device 666 that may be configured to couple the fiber stub 604 to the optoelectronic device 602. The retention device 666 may include a first end configured to be positioned against a fiber side of the fiber stub flange 620 of the fiber stub 604 and a second end that may be configured to be positioned against an optoelectronic device side of a sleeve flange 612 of the sleeve 610 of the optoelectronic assembly 600.

The retention device 666 may include a base 668, first and second arms 670a and 670b, first and second fingers 672a and 672b, and a spring 674. The base 668 may form a first end of the retention device 666 and may define a void within a center portion of the base 668. For example, the base 668 may define the void such that a portion of the fiber stub 604 may be inserted through the void. The base 668 may be configured to be substantially perpendicular to an optical path through the optoelectronic device 602 and the fiber stub 604.

The fiber stub flange 620 may include a first cutout and a second cutout, opposite the first cutout. The first cutout may be configured to interface with and/or contact a midsection of the first arm 670a. The second cutout may be configured to interface with and/or contact a midsection of the second arm 670b. For example, the first cutout and the second cutout may be configured to interface with and/or contact the midsection of the first arm 670a and to interface with and/or contact the midsection of the second arm 670b such that the retention device 666 may surround a portion of the fiber stub 604 and may interface with and/or contact the fiber stub 604 at one or more locations.

The spring 674 may extend around a portion of the fiber stub 604 and may include a central axis that is substantially parallel to and/or collinear with the optical path. The spring 674 may include a first end and a second end, the first end of the spring 674 configured to apply a first force to the fiber side of the fiber stub flange 620 and a second end of the spring 674 configured to apply a third force, opposite the first force, to the base 668. The spring 674 may be generally configured as a compression spring in this example.

The first and second arms 670a and 670b may extend generally perpendicular from the base 668, the first arm 670a opposite the base 668 from the second arm 670b, with a first portion of the first and second arms 670a and 670b extending substantially parallel to the optical path. The first and second arms 670a and 670b may be curved such that the first and second arms 670a and 670b may extend around and may interface with and/or contact the sleeve flange 612 and the fiber stub flange 620.

The first arm 670a may include the first finger 672a that extends from a first end of the first arm 670a and is configured to engage the optoelectronic device side of the sleeve flange 612. The second arm 670b may include the second finger 672b that extends from a first end of the second arm 670b and is configured to engage the optoelectronic device side of the sleeve flange 612. The first and second arms 670a and 670b and the first and second fingers 672a and 672b may be configured to apply a second force, opposite the first force, to the optoelectronic device side of the sleeve flange 612. The spring 674 may increase the second force applied by the first and second arms 670a and 670b and the first and second fingers 672a and 672b.

Modifications, additions, or omissions may be made to the optoelectronic assembly 600 without departing from the scope of the present disclosure. For example, although the retention device 666 has been described as coupling the optoelectronic device 602 and the fiber stub 604 together, other embodiments described herein may include retention devices that couple two fiber stubs together.

Figure 7C:
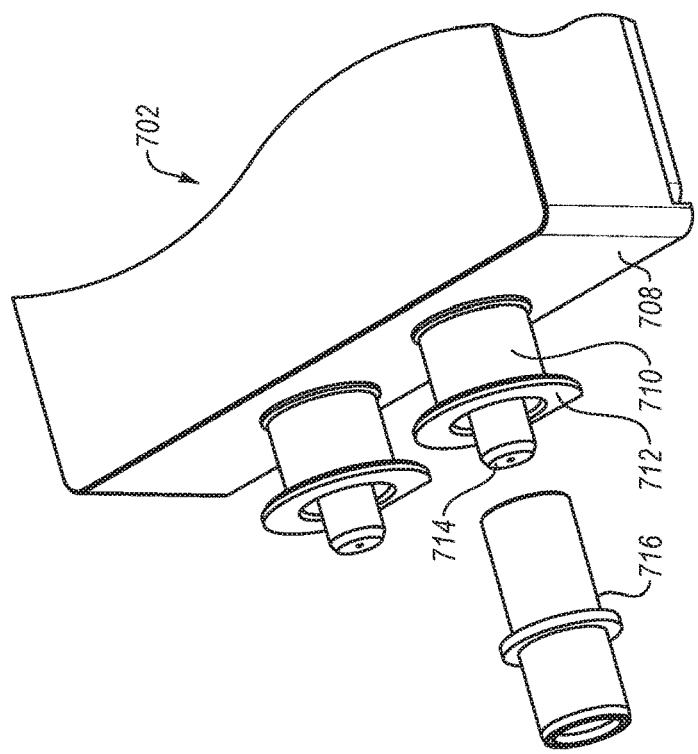
Figure 7C:
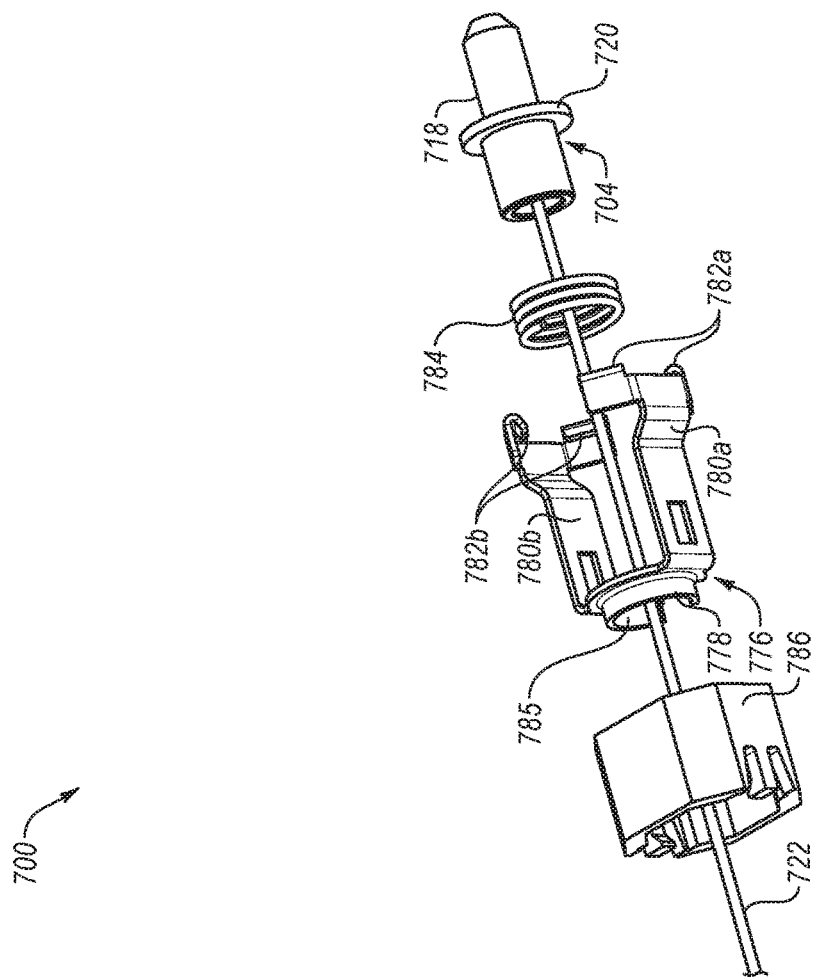

FIGS. 7A-7C include various views of another example optoelectronic assembly 700 that includes an optoelectronic device 702, a fiber stub 704, and a retention device 776, arranged in accordance with at least one embodiment described herein. FIG. 7A is a side view, FIG. 7B is a top fiber side perspective view, and FIG. 7C is an exploded top fiber side perspective view. The optoelectronic device 702 may be coupled to the fiber stub 704 via the retention device 776.

Some components of the optoelectronic assembly 700 of FIGS. 7A-7C may be comparable or similar to the similarly named components of the optoelectronic assembly 100 of FIG. 1. For example, the optoelectronic device 702, the fiber stub 704, and the retention device 776 of FIGS. 7A-7C may be similar or comparable to the optoelectronic device 102, the fiber stub 104, and the retention device 106 of FIG. 1.

The optoelectronic device 702 may include an OSA box 708, a sleeve 710; a ferrule 714, and a receptacle 716. The fiber stub 704 may include a fiber stub end 718 and a fiber stub flange 720 coupled to an optical fiber 722, and a stripped bare fiber that extends from the optical fiber 722 through the fiber stub end 718.

The retention device 776 may be configured to couple the fiber stub 704 to the optoelectronic device 702. The retention device 776 may include a first end configured to be positioned against a fiber side of the fiber stub flange 720 of the fiber stub 704 and a second end that may be configured to be positioned against an optoelectronic device side of a sleeve flange 712 of the sleeve 710 of the optoelectronic assembly 700.

The retention device 776 may include a base 778, first and second arms 780a and 780b, a first and second set of fingers 782a and 782b, and a spring 784. The base 778 may form a first end of the retention device 776 and may define a void 785 within a center portion of the base 778. For example, the base 778 may define the void 785 such that a portion of the fiber stub 704 may be inserted through the void 785. The base 778 may be configured to be arranged substantially perpendicular to an optical path through the optoelectronic device 702 and the fiber stub 704.

The spring 784 may extend around a portion of the fiber stub 704 and include a central axis substantially parallel to and/or collinear with the optical path. The spring 784 may include a first end and a second end, the first end of the spring 784 configured to apply a first force to the fiber side of the fiber stub flange 720 and a second end of the spring 784 configured to apply a third force, opposite the first force, to the base 778.

The first and second arms 780a and 780b may extend generally perpendicular from the base 778, the first arm 780a opposite the base 778 from the second arm 780b, with a first portion of the first and second arms 780a and 780b extending substantially parallel to the optical path. The first and second arms 780a and 780b may be curved such that the first and second arms 780a and 780b may extend around and may interface with and/or contact the sleeve flange 712 and the fiber stub flange 720.

The first arm 780a may include the first set of fingers 782a that extend from a first end of the first arm 780a and is configured to engage the optoelectronic device side of the sleeve flange 712. The second arm 780b may include the second set of fingers 782b that extends from a first end of the second arm 780b and is configured to engage the optoelectronic device side of the sleeve flange 712. The first and second arms 780a and 780b and the first and second set of fingers 782a and 782b may be configured to apply a second force, opposite the first force, to the optoelectronic device side of the sleeve flange 712.

The optoelectronic assembly 700 may also include a retention device 786. The retention device 786 may be configured to interface with and surround a portion of the first arm 780a and the second arm 780b and to impose a second set of inwardly directed opposing forces to the first arm 780a and the second arm 780b such that the first arm 780a and the second arm 780b are forced toward the sleeve 710. Additionally or alternatively, the retention device 786 may be configured to impose the second set of inwardly directed opposing forces to the first arm 780a and the second arm 780b such that the first arm 780a and the second arm 780b and the first and second set of fingers 782a and 782b are forced toward the sleeve 710. Additionally, or alternatively, after positioning the retention device 776 with the first and second sets of fingers 782a, 782b to the optoelectronic device side of the sleeve flange 712, the retention device 786 may be positioned to surround the portion of the first and second arms 780a, 780b. The retention device 786 may have dimensions to radially constrain the first and second arms 780a, 780b, and thus the first and second set of fingers 782a, 782b so as to inhibit the first and second sets of fingers 782a, 782b from moving radially outward to disengage from the optoelectronic device side of the sleeve flange 712 while the retention device 786 is positioned to surround the portion of the first and second arms 780a, 780b.

Modifications, additions, or omissions may be made to the optoelectronic assembly 700 without departing from the scope of the present disclosure. For example, although the retention device 786 has been described as coupling the optoelectronic device 702 and the fiber stub 704 together, other embodiments described herein may include retention devices that couple two fiber stubs together.

Figure 8A:
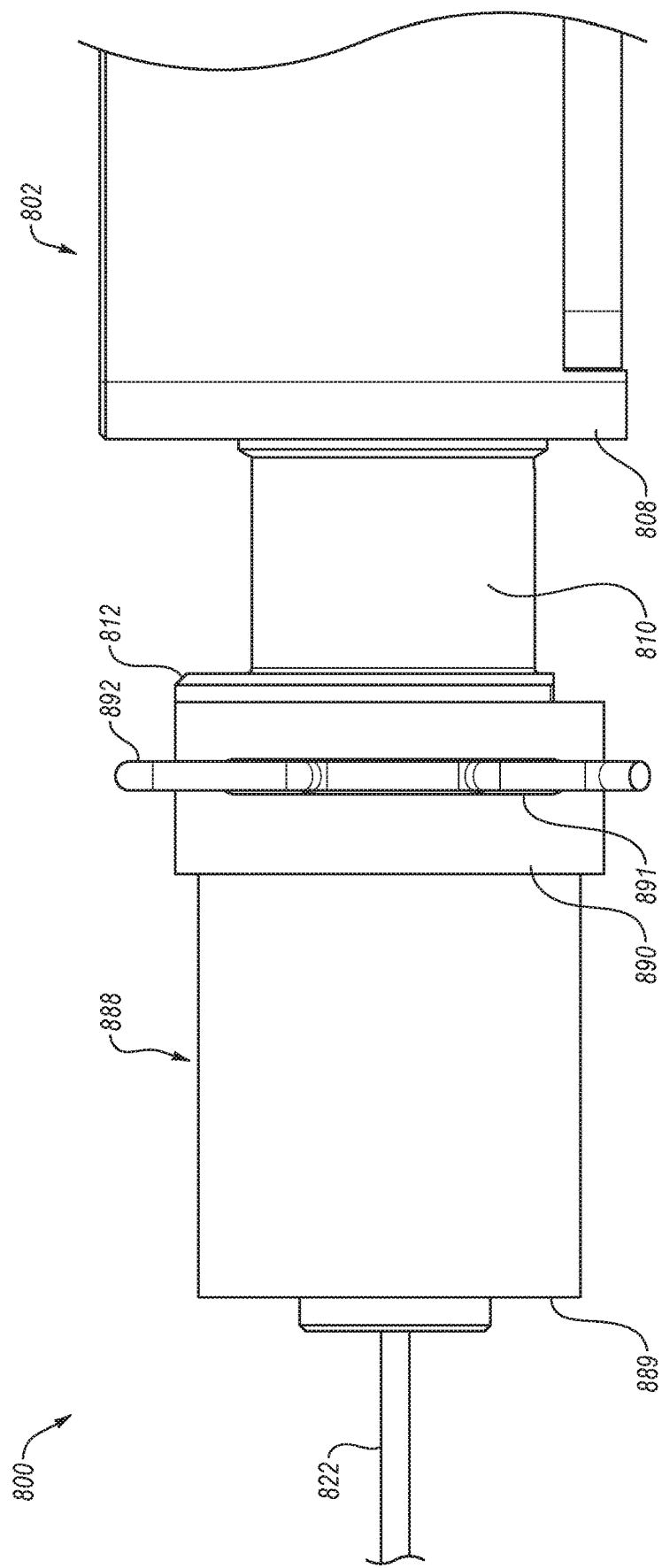
Figure 8C:
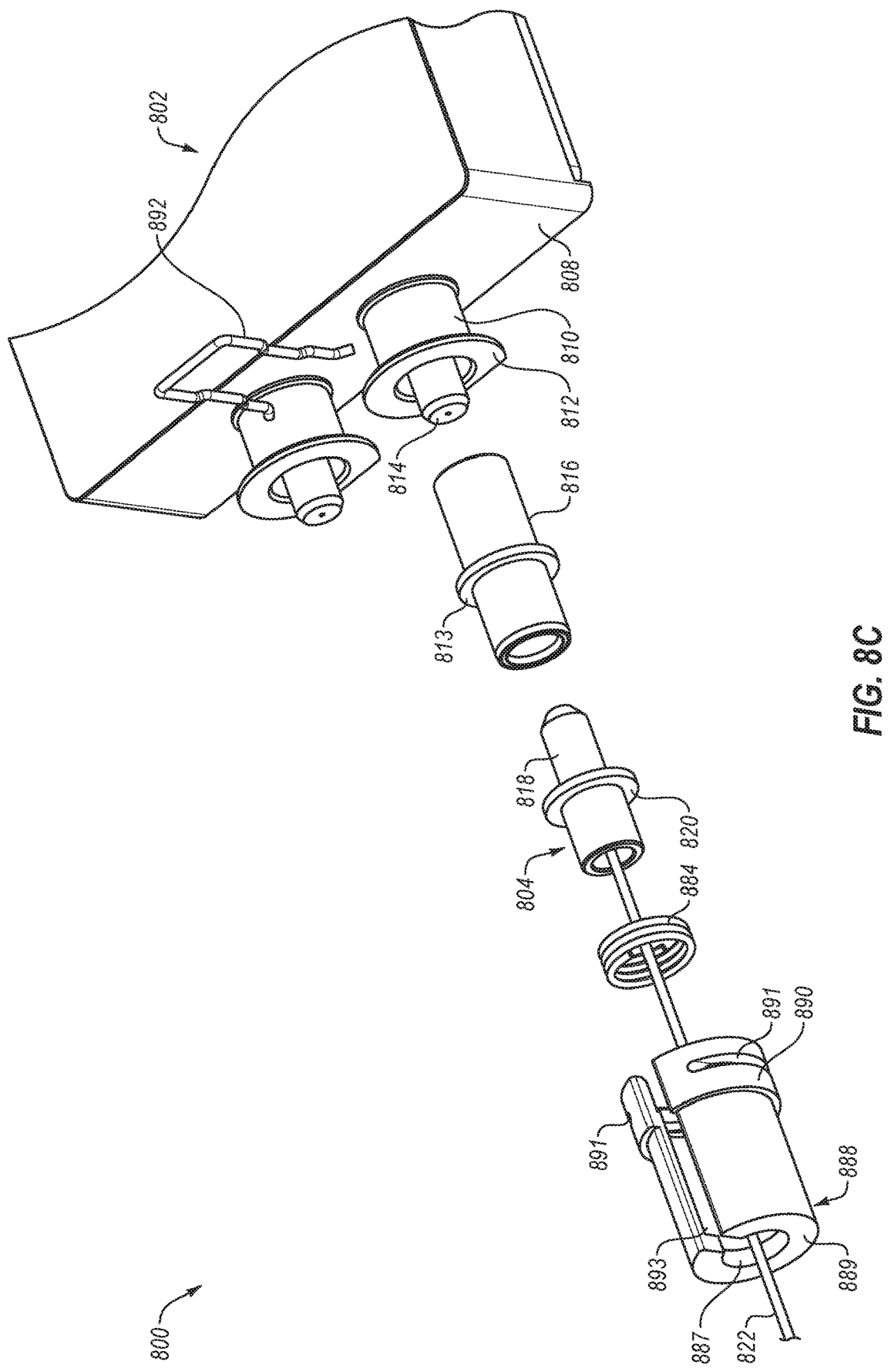

FIGS. 8A-8C include various views of another example optoelectronic assembly 800 that includes an optoelectronic device 802, a fiber stub 804, and a retention device 888, arranged in accordance with at least one embodiment described herein. FIG. 8A is a side view, FIG. 8B is a top fiber side perspective view, and FIG. 8C is an exploded top fiber side perspective view. The optoelectronic device 802 may be coupled to the fiber stub 804 via the retention device 888.

Some components of the optoelectronic assembly 800 of FIGS. 8A-8C may be comparable or similar to the similarly named components of the optoelectronic assembly 100 of FIG. 1. For example, the optoelectronic device 802, the fiber stub 804, and the retention device 888 of FIGS. 8A-8C may be similar or comparable to, respectively, the optoelectronic device 102, the fiber stub 104, and the retention device 106 of FIG. 1.

The optoelectronic device 802 may include an OSA box 808, a sleeve 810; a ferrule 814, and a receptacle 816. The fiber stub 804 may include a fiber stub end 818 and a fiber stub flange 820 coupled to an optical fiber 822, and a stripped bare fiber that extends from the optical fiber 822 through the fiber stub end 818.

The retention device 888 may be configured to couple the fiber stub 804 to the optoelectronic device 802. The retention device 888 may retention sleeve include a first end configured to be positioned against a fiber side of the fiber stub flange 820 of the fiber stub 804 and a second end that may be configured to be positioned against a fiber side of a sleeve flange 812 of the sleeve 810 of the optoelectronic assembly 800 or an optoelectronic device side of a receptacle flange 813 of the receptacle 816 of the optoelectronic assembly 800.

The retention device 888 may be any size or shape and may be configured to surround a portion of the receptacle 816 and the fiber stub 804. The retention device 888 may include a spring 884, an interior flange 889, an exterior flange 890, retention clip slots 891, a retention clip 892, and a lengthwise slot (hereinafter "slot") 893.

The spring 884 may extend around a portion of the fiber stub 804 and may include a central axis that is substantially parallel to and/or collinear with an optical path through the ferrule 814 and the fiber stub 804. The spring 884 may include a first end and a second end, the first end of the spring 884 configured to apply a first force to the fiber side of the fiber stub flange 820 and a second end of the spring 884 configured to apply a second force, opposite the first force, to the interior flange 889.

The interior flange 889 may be located at a first end of the retention device 888. The interior flange 889 may define a void 887 within a center portion of the interior flange 889. For example, the interior flange 889 may define the void 887 such that a portion of the fiber stub 804 may be inserted through the void 887. Accordingly, the void 887 defined by the interior flange 889 may have a complementary shape to the portion of the fiber stub 804 in some embodiments.

The exterior sleeve flange 890 may be located at a second end of the retention device 888, opposite the first end of the retention device 888. The exterior sleeve flange 890 may be configured to surround a portion of the receptacle 816. The exterior sleeve flange 890 may include the retention spring slots 891 that may receive the retention clip 892.

The retention clip 892 may be formed into any shape and may be configured to interface with and/or contact the optoelectronic device side of a receptacle flange 813 of the receptacle 816 and/or the retention spring slots 891. Additionally or alternatively, the retention clip 892 may be configured to interface with and/or contact an optoelectronic device side of the sleeve flange 812.

The slot 893 may extend a length of the retention device 888. The slot 893 may facilitate assembly of the retention device to the fiber stub 804.

Modifications, additions, or omissions may be made to the optoelectronic assembly 800 without departing from the scope of the present disclosure. For example, although the retention device 888 has been described as coupling the optoelectronic device 802 and the fiber stub 804 together, other embodiments described herein may include retention devices that couple two fiber stubs together.

Figure 9A:
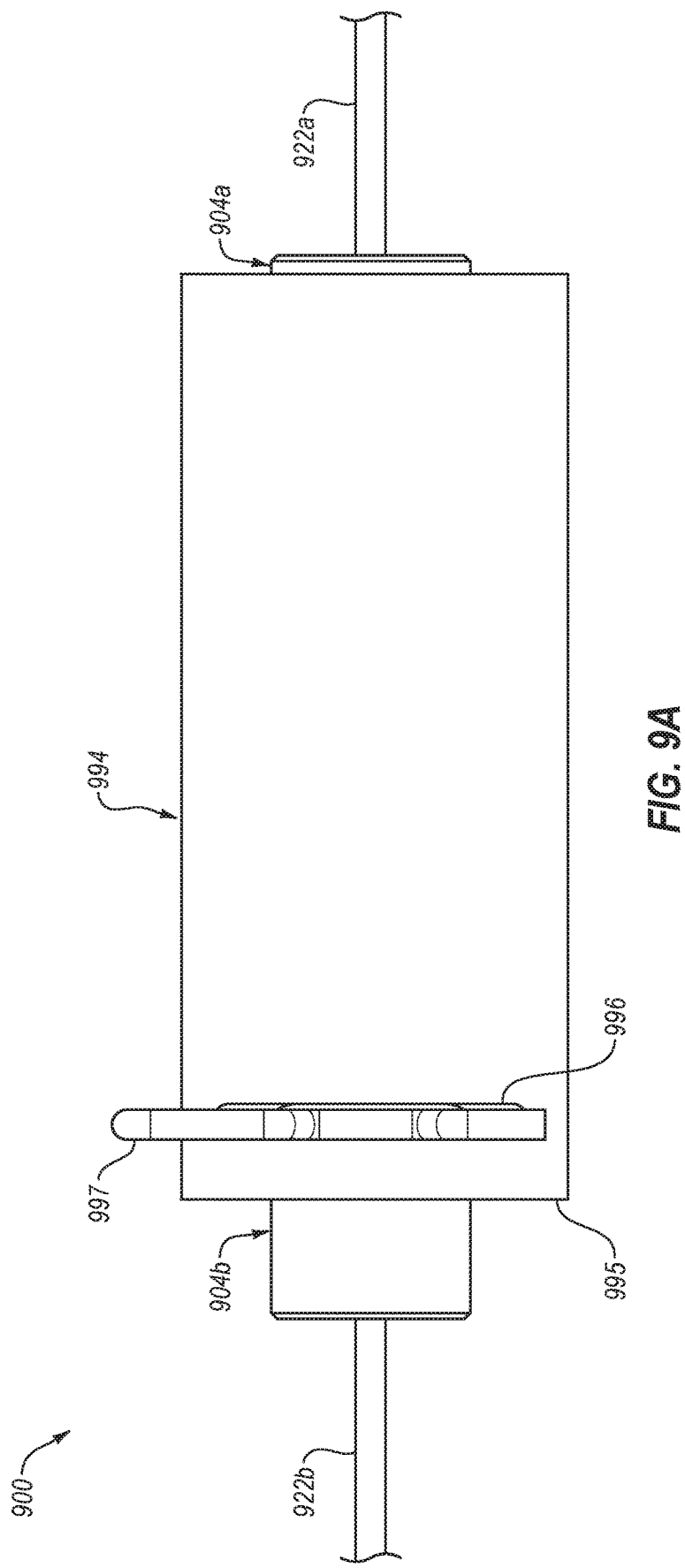
FIGS. 9A-9C include various views of an example fiber-to-fiber connection assembly.
Figure 9B:
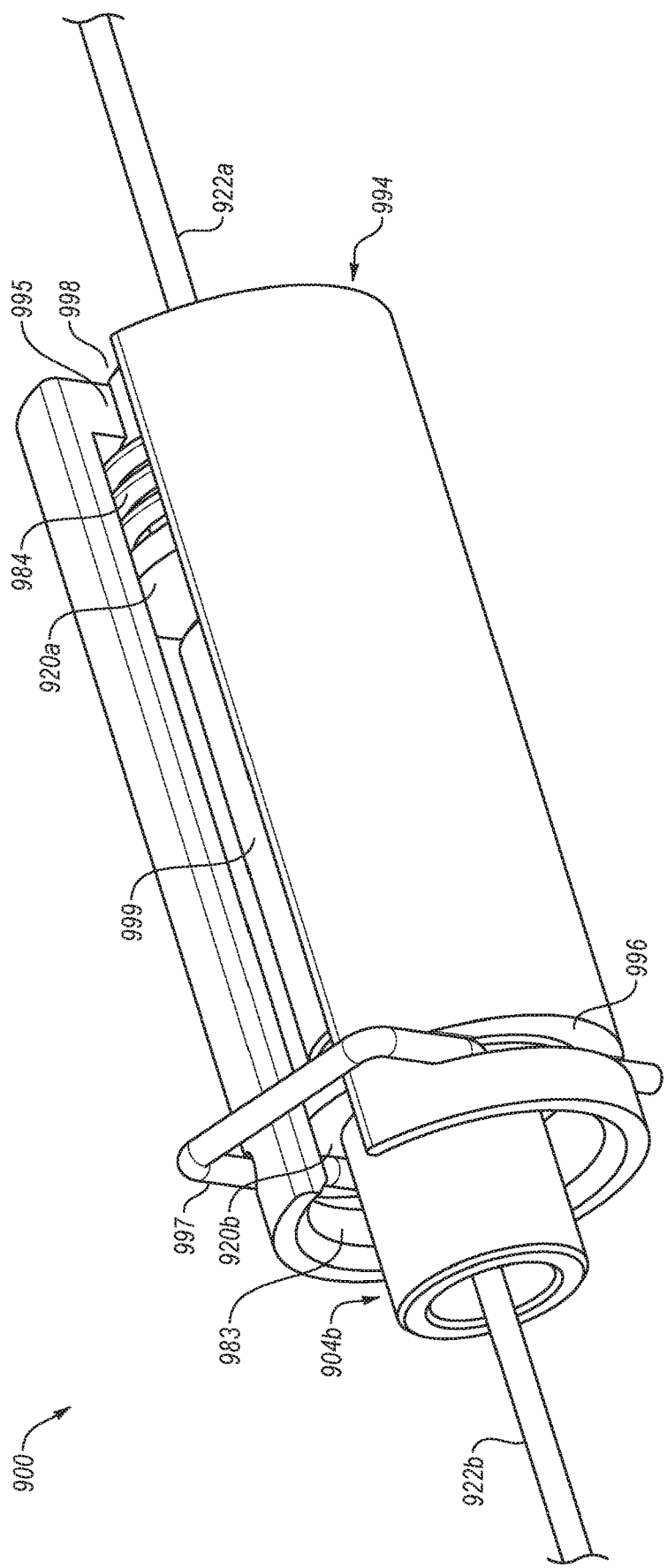
Figure 9C:
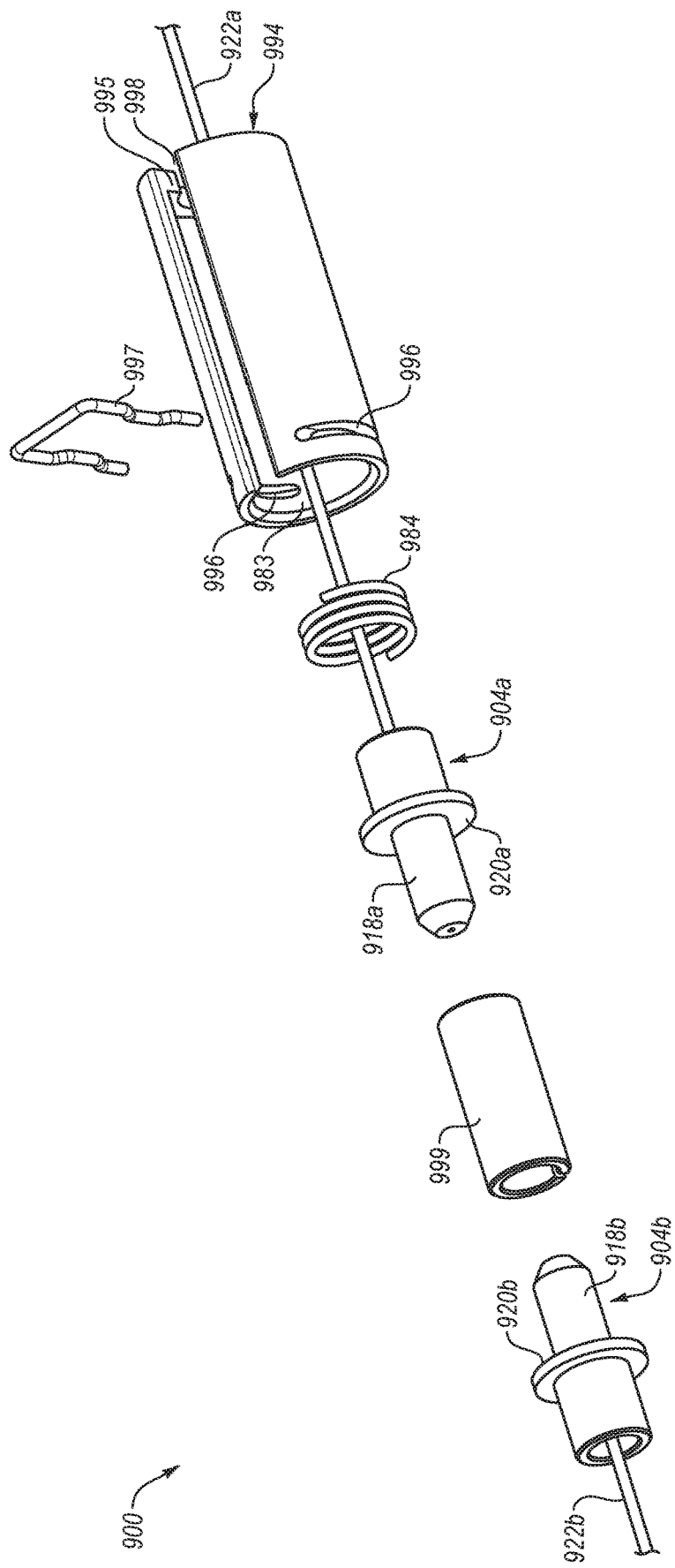

FIGS. 9A-9C include various views of an example fiber-to-fiber connection assembly 900 that includes a first fiber stub 904a, a second fiber stub 904b, and a retention device 994, arranged in accordance with at least one embodiment described herein. FIG. 9A is a side view, FIG. 9B is a perspective view, and FIG. 9C is an exploded perspective view. The first fiber stub 904a may be coupled to the second fiber stub 904b via the retention device 994.

Some components of the fiber-to-fiber connection assembly 900 of FIGS. 9A-9C may be comparable or similar to the similarly named components of the optoelectronic assembly 100 of FIG. 1. For example, the first fiber stub 904a and the second fiber stub 904b of FIGS. 9A-9C may be similar or comparable to the fiber stub 104 of FIG. 1.

The first fiber stub 904a may include a first fiber stub end 918a and a first fiber stub flange 920a coupled to a first optical fiber 922a, and a first stripped bare fiber that extends from the first optical fiber 922a through the first fiber stub end 918a. The second fiber stub 904b may include a second fiber stub end 918b, a second fiber stub flange 920b, and a second optical fiber 922b, and a second stripped bare fiber that extends from the second optical fiber 922b through the second fiber stub end 918b.

The retention device 994 that may be configured to couple the first fiber stub 904a to the second fiber stub 904b. The retention device 994 may include a first end configured to be positioned against a first fiber side of the first fiber stub flange 920a of the first fiber stub 904a of the fiber-to-fiber connection assembly 900. The retention device 994 may include a second end configured to be positioned against a second fiber side of the second fiber stub flange 920b of the second fiber stub 904b of the fiber-to-fiber connection assembly 900. The second fiber side may be opposite the first fiber side.

The retention device 994 may be any size or shape and may be configured to surround a first portion of the first fiber stub 904a and a second portion of the second fiber stub 904b. The retention device 994 may include a spring 984, an interior flange 995, retention clip slots 996, a retention clip 997, and a lengthwise slot (hereinafter "slot") 998.

The spring 984 may extend around a portion of the second fiber stub 904b and may include a central axis that is substantially parallel to and/or collinear with an optical path through the first fiber stub 904a and the second fiber stub 904b. The spring 984 may include a first end and a second end, the first end of the spring 984 configured to apply a first force to the first fiber side of the first fiber stub flange 920a and a second end of the spring 984 configured to apply a second force, opposite the first force, to the interior flange 995. The spring 984 may be generally configured as a compression spring in this example.

The interior flange 995 may be located at a first end of the retention device 994. The interior flange 995 may define a void 983 within a center portion of the interior flange 995. For example, the interior flange 995 may define the void 983 such that a portion of the first fiber stub 904a may be inserted through the void. The void 983 may have a shape that is complementary to a shape of the portion of the first fiber stub 904a that passes therethrough in some embodiments.

The second end of the retention device 994 may include the retention clip slots 996 that may receive the retention clip 997. The retention clip 997 may be formed into any shape and may be configured to interface with and/or contact the second fiber side of the second fiber stub flange 920b. The slot 998 may extend a length of the retention device 994. The slot 998 may facilitate assembly of the retention device to either or both of the fiber stubs 904a, 904b.

The fiber-to-fiber connection assembly 900 may also include a split sleeve 999. The split sleeve 999 may be generally cylindrical in shape and may include a slot that extends a length of the split sleeve 999. The split sleeve 999 may be configured to be surrounded by a portion of the retention device 994 and to couple the first fiber stub end 918a and the second fiber stub end 918b. For example, the first end of the split sleeve 999 may be configured to receive the first fiber stub end 918a. The second end of the split sleeve 999 may be configured to receive the second fiber stub end 918b.

Modifications, additions, or omissions may be made to the fiber connection assembly 900 without departing from the scope of the present disclosure.

Figure 10:
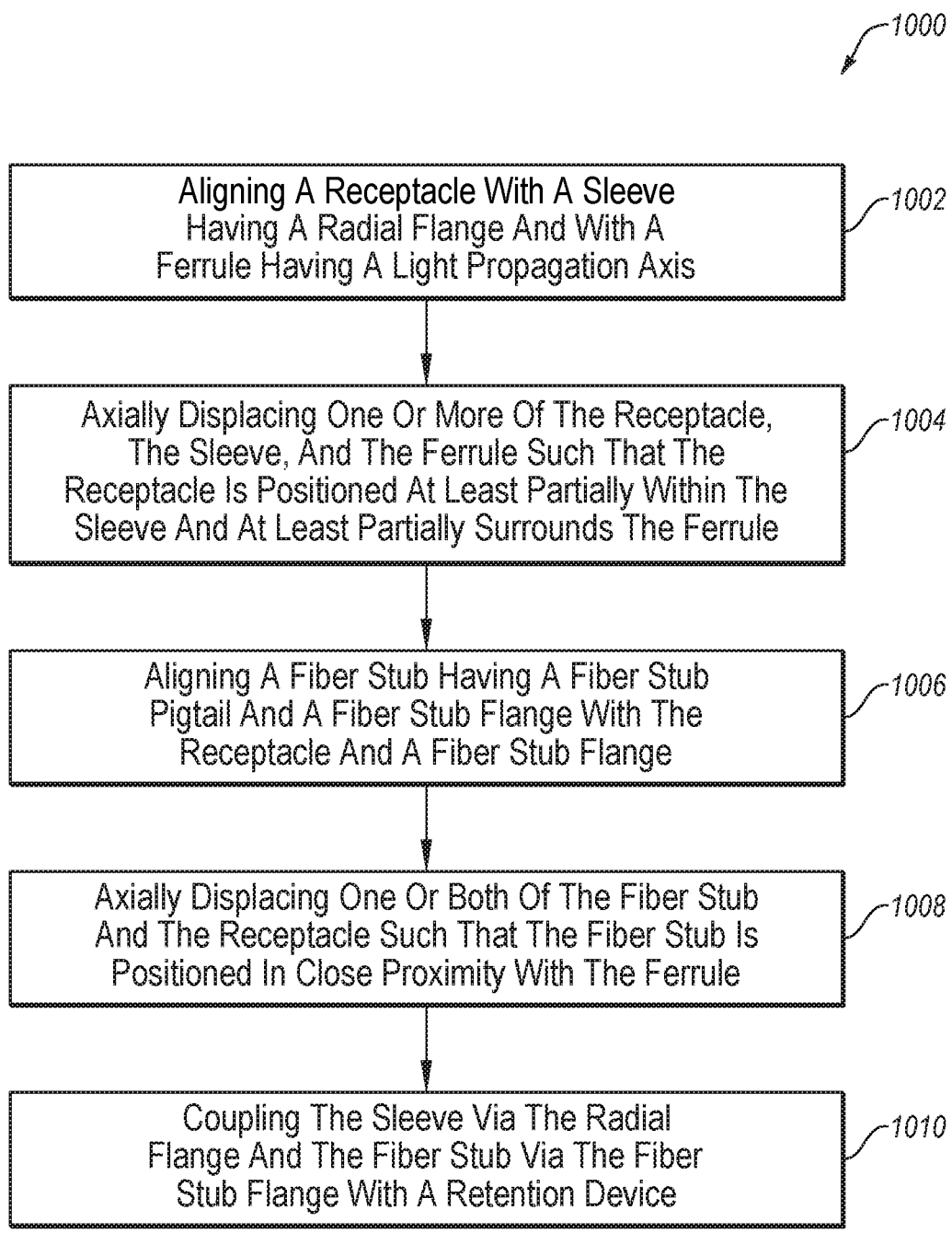
FIG. 10 is flow chart of an example method to assemble an optoelectronic device to a fiber stub with a retention device, all arranged in accordance with at least one embodiment described herein.

FIG. 10 is flow chart of an example method 1000 to assemble an optoelectronic device to a fiber stub with a retention device. The method 1000 may include one or more of steps 1002, 1004, 1006, 1008, and/or 1010. Step 1002 includes aligning a receptacle with a sleeve having a radial flange and with a ferrule having a light propagation axis. Step 1004 includes axially displacing one or more of the receptacle, the sleeve, and the ferrule such that the receptacle is positioned at least partially within the sleeve and at least partially surrounds the ferrule. Step 1006 includes aligning a fiber stub having a fiber stub pigtail and a fiber stub flange with the receptacle. Step 1008 includes axially displacing one or both of the fiber stub and the receptacle such that the fiber stub is positioned in close proximity with the ferrule. Step 1010 includes coupling the sleeve via the radial flange and the fiber stub via the fiber stub flange with a retention device.

One skilled in the art will appreciate that the method 1000 disclosed herein and the functions performed in the method 1000 may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." Additionally, use of the term "and/or" in some places does not mean that the term "or" should be understood to only include either of the terms as opposed to including the possibility of both terms.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An optoelectronic device interface connection for connecting an optical fiber to an optoelectronic device, the optical fiber having a fiber stub disposed thereon, the fiber stub having a fiber stub flange, the connection comprising:
   a port assembly for the optoelectronic device, the port assembly comprising:
      a sleeve;
      a receptacle comprising a first end of the receptacle and a second end of the receptacle, the first end of the receptacle opposite the second end of the receptacle, wherein:
         the first end of the receptacle is configured to receive at least a first portion of the fiber stub;
         the second end of the receptacle is at least partially received in the first end of the sleeve; and
         one or both of the sleeve and the receptacle comprises a radial flange; and
      a ferrule positioned within at least a portion of the receptacle and configured to be optically aligned with the fiber stub, the ferrule and the fiber stub forming an optical path, wherein the sleeve, the receptacle, and the ferrule are arranged in longitudinal alignment to the fiber stub and the optical fiber; and
   a retention device comprising:
      a first end of the retention device configured to be positioned against a fiber side of the fiber stub flange of the fiber stub; and
      a second end of the retention device configured to be positioned against an optoelectronic device side of the radial flange,
      the retention device having an open side extending longitudinally between the first and second ends of the retention device, the open side being configured to position transversely relative to the longitudinal alignment of the sleeve, the receptacle, and the ferrule to the fiber stub and the optical fiber.

2. The optoelectronic device interface connection of claim 1, wherein the retention device is configured to apply inwardly directed opposing forces along the longitudinal alignment to the optoelectronic device side of the radial flange and the fiber side of the fiber stub flange to maintain the ferrule and the fiber stub in close proximity.

3. The optoelectronic device interface connection of claim 1, wherein the retention device further comprises a base configured to be substantially parallel to the optical path, a first spring that extends from a first end of the base, and a second spring that extends from a second end of the base, wherein:
   the first spring forms the first end of the retention device and extends generally perpendicular from the base, wherein the first spring includes a first open-sided collar, the first spring configured to apply a first force along the longitudinal alignment to the fiber side of the fiber stub flange; and
   the second spring forms the second end of the retention device and extends generally perpendicular from the base, wherein the second spring includes a second open-sided collar, the second spring configured to apply a second force along the longitudinal alignment to the optoelectronic device side of the radial flange.

4. The optoelectronic device interface connection of claim 1, wherein the retention device further comprises a base, wherein a first spring that forms the second end of the retention device and extends away from the base, wherein the first spring includes a first an open-sided collar;

a first arm that extends from the base of the retention device to the first end of the retention device;

a first finger that extends from an end of the first arm, the first finger configured to engage the fiber side of the fiber stub flange;

a second arm that extends from the base of the retention device to the first end of the retention device; and a second finger that extends from an end of the second arm, the second finger configured to engage the fiber side of the fiber stub flange, wherein the first spring is configured to apply a first force along the longitudinal alignment to the optoelectronic device side of the radial flange; and wherein the first arm, the first finger, the second arm, and the second finger are configured to apply a second force, opposite the first force, along the longitudinal alignment to the fiber side of the fiber stub flange.

5. The optoelectronic device interface connection of claim 1, wherein the retention device further comprises a base comprising a curved portion that defines a void within a center portion of the curved portion, wherein a first portion of the curved portion is configured to be substantially parallel to the optical path; a first spring that extends from the first end of the base; a second spring that extends from a second end of the base, wherein:

the first spring forms the first end of the retention device and extends away from the base, wherein the first spring is configured to apply a first force along the longitudinal alignment to the fiber side of the fiber stub flange;

the second spring forms the second end of the retention device and extends away from the base, wherein the second spring is configured to apply a second force along the longitudinal alignment to the optoelectronic device side of the radial flange;

a tab that extends away from the second end of the base and above a first portion of the sleeve;

a first finger that extends from a first end of the second spring and toward a second portion of the sleeve; and a second finger that extends from a second end of the second spring and toward a third portion of the sleeve, opposite the second portion of the sleeve, the first finger and the second finger extend toward each other, wherein a distance between an innermost end of the first finger and an innermost end of the second finger is shorter than an outer diameter of the sleeve.

6. The optoelectronic device interface connection of claim 1, wherein the retention device further comprises:

a first retention clamp that forms the first end of the retention device, the first retention clamp configured to:
form a first open-sided collar around the fiber stub;
interface with a first side of the fiber stub;
interface with a second side of the fiber stub, opposite the first side of the fiber stub; and
apply a first force along the longitudinal alignment to the fiber side of the fiber stub flange;

a second retention clamp that forms the second end of the retention device, the second retention clamp configured to:
form a second open-sided collar around the sleeve;
interface with a first side of the sleeve;
interface with second side of the sleeve, opposite the first side of the sleeve; and apply a second force along the longitudinal alignment to the optoelectronic device side of the radial flange;

a first arm that extends from the first retention clamp to the second retention clamp; and a second arm, opposite the first arm, that extends from the first retention clamp to the second retention clamp, wherein the first arm and the second arm are configured to apply inwardly directed opposing forces along the longitudinal alignment to the optoelectronic device side of the radial flange and the fiber side of the fiber stub flange through the first and second retention clamps to maintain the ferrule and the fiber stub in close proximity.

7. The optoelectronic device interface connection of claim 1, wherein the retention device further comprises:

a retention sleeve configured to surround a portion of the receptacle, the retention sleeve defining a longitudinal slot therealong and comprising:
an interior flange at a first end of the retention sleeve, forming the first end of the retention device; and
a retention clip slot at a second end of the retention sleeve, opposite the first end of the retention sleeve;

a spring comprising a central axis substantially parallel to the optical path, a first end of the spring configured to apply a first force along the longitudinal alignment to the fiber side of the fiber stub flange and a second end of the spring configured to apply a third force, opposite the first force, along the longitudinal alignment to the interior flange; and a retention clip configured to be inserted into the retention clip slot and to apply a second force along the longitudinal alignment to an optoelectronic device side of a receptacle flange, the retention clip located between the receptacle flange and the radial flange, wherein the first force and the second force are applied to maintain the ferrule and the fiber stub in close proximity.

8. An optoelectronic assembly for use with an optical fiber having a fiber stub, the fiber stub having a fiber stub flange, the assembly comprising:

an optical subassembly (OSA) comprising:
an OSA box;
a port assembly, coupled to the OSA box, the port assembly comprising:
a sleeve;
a receptacle comprising a first end of the receptacle and a second end of the receptacle, the first end of the receptacle opposite the second end of the receptacle, wherein:
the first end of the receptacle is configured to receive at least a portion of the fiber stub;
the second end of the receptacle is at least partially received in the first end of the sleeve;
one or both of the sleeve and the receptacle comprises a radial flange; and
a ferrule positioned within at least a portion of the receptacle and configured to be optically aligned with the fiber stub, the ferrule and the fiber stub forming an optical path, wherein the sleeve, the receptacle, and the ferrule are arranged in longitudinal alignment to the fiber stub and the optical fiber; and a retention device comprising:
a first end of the retention device configured to be positioned against a fiber side of the fiber stub flange of the fiber stub; and a second end of the retention device configured to be positioned against an optoelectronic device side of the radial flange, the retention device having an open side extending longitudinally between the first and second ends of the retention device, the open side being configured to position transversely relative to the longitudinal alignment of the sleeve, the receptacle, and the ferrule to the fiber stub and the optical fiber.

9. The optoelectronic assembly of claim 8, wherein the retention device is configured to apply inwardly directed opposing forces along the longitudinal alignment to the optoelectronic device side of the radial flange and the fiber side of the fiber stub flange to maintain the ferrule and the fiber stub in close proximity.

10. The optoelectronic assembly of claim 8, wherein the retention device further comprises a base configured to be substantially parallel to the optical path, a first spring that extends from a first end of the base, and a second spring that extends from a second end of the base, wherein:

the first spring forms the first end of the retention device and extends generally perpendicular from the base, wherein the first spring includes a first open-sided collar, the first spring configured to apply a first force along the longitudinal alignment to the fiber side of the fiber stub flange; and the second spring forms the second end of the retention device and extends generally perpendicular from the base, wherein the second spring includes a second open-sided collar, the second spring configured to apply a second force along the longitudinal alignment to the optoelectronic device side of the radial flange.

11. The optoelectronic assembly of claim 8, wherein the retention device further comprises a base, wherein a first spring that forms the second end of the retention device and extends away from the base, wherein the first spring includes an open-sided collar;

a first arm that extends from the base of the retention device to the first end of the retention device;

a first finger that extends from an end of the first arm, the first finger configured to engage the fiber side of the fiber stub flange;

a second arm that extends from the base of the retention device to the first end of the retention device; and a second finger that extends from an end of the second arm, the second finger configured to engage the fiber side of the fiber stub flange, wherein the first spring is configured to apply a first force along the longitudinal alignment to the optoelectronic device side of the radial flange; and wherein the first arm, the first finger, the second arm, and the second finger are configured to apply a second force, opposite the first force, along the longitudinal alignment to the fiber side of the fiber stub flange.

12. The optoelectronic assembly of claim 8, wherein the retention device further comprises a base comprising a curved portion that defines a void within a center portion of the curved portion, wherein a first portion of the curved portion 1s configured to be substantially parallel to the optical path; a first spring that extends from the first end of the base; a second spring that extends from a second end of the base, wherein:

the first spring forms the first end of the retention device and extends away from the base, wherein the first spring is configured to apply a first force along the longitudinal alignment to the fiber side of the fiber stub flange;

the second spring forms the second end of the retention device and extends away from the base, wherein the second spring is configured to apply a second force along the longitudinal alignment to the optoelectronic device side of the radial flange the fiber stub flange;

a tab that extends away from the second end of the base and above a first portion of the sleeve;

a first finger that extends from a first end of the second spring and toward a second portion of the sleeve; and a second finger that extends from a second end of the second spring and toward a third portion of the sleeve, opposite the second portion of the sleeve, the first finger and the second finger extend toward each other, wherein a distance between an innermost end of the first finger and an innermost end of the second finger is shorter than an outer diameter of the sleeve.

13. The optoelectronic assembly of claim 8, wherein the retention device further comprises:

a first retention clamp that forms the first end of the retention device, the first retention clamp configured to:
 form a first open-side collar around the fiber stub;
 interface with a first side of the fiber stub;
 interface with a second side of the fiber stub, opposite the first side of the fiber stub; and
 apply a first force along the longitudinal alignment to the fiber side of the fiber stub flange;

a second retention clamp that forms the second end of the retention device, the second retention clamp configured to:
 form a second open-sided collar around the sleeve;
 interface with a first side of the sleeve;
 interface with second side of the sleeve, opposite the first side of the sleeve; and
 apply a second force along the longitudinal alignment to the optoelectronic device side of the radial flange;

a first arm that extends from the first retention clamp to the second retention clamp; and a second arm, opposite the first arm, that extends from the first retention clamp to the second retention clamp, wherein the first arm and the second arm are configured to apply inwardly directed opposing forces along the longitudinal alignment to the optoelectronic device side of the radial flange and the fiber side of the fiber stub flange through the first and second retention clamps to maintain the ferrule and the fiber stub in close proximity.

14. The optoelectronic assembly of claim 8, wherein the retention device further comprises:

a retention sleeve configured to surround a portion of the receptacle, the retention sleeve comprising:
 an interior flange at a first end of the retention sleeve, forming the first end of the retention device; and
 a retention clip slot at a second end of the retention sleeve, opposite the first end of the retention sleeve;

a spring comprising a central axis substantially parallel to the optical path, a first end of the spring configured to apply a first force to the fiber side of the fiber stub flange and a second end of the spring configured to apply a third force, opposite the first force, to the interior flange; and a retention clip configured to be inserted into the retention clip slot and to apply a second force to an optoelectronic device side of a receptacle flange, the retention clip located between the receptacle flange and the radial flange, wherein the first force and the second force are applied to maintain the ferrule and the fiber stub in close proximity.

15. A method of assembling an optoelectronic assembly comprising:
aligning a receptacle with a sleeve having a radial flange and with a ferrule having a light propagation axis;
axially displacing one or more of the receptacle, the sleeve, and the ferrule such that the receptacle is positioned at least partially within the sleeve and at least partially surrounds the ferrule;
aligning a fiber stub having a fiber stub pigtail and a fiber stub flange with the receptacle;
axially displacing one or both of the fiber stub and the receptacle such that the fiber stub is positioned in close proximity with the ferrule; and
coupling the sleeve via the radial flange and the fiber stub via the fiber stub flange with a retention device by:
fitting a longitudinally open side of the retention device transversely on the longitudinal alignment of the sleeve, the receptacle, and the ferrule to the fiber stub and the optical fiber;
positioning a first end of the retention device against an optoelectronic device side of the radial flange; and
positioning a second end of the retention device against a fiber side of the fiber stub flange.

16. An optoelectronic device interface connection for connecting an optical fiber to an optoelectronic device, the optical fiber having a fiber stub disposed thereon, the fiber stub having a fiber stub flange, the connection comprising:
a port assembly for the optoelectronic device, the port assembly comprising:
a sleeve;
a receptacle comprising a first end of the receptacle and a second end of the receptacle, the first end of the receptacle opposite the second end of the receptacle, wherein:
the first end of the receptacle is configured to receive at least a first portion of the fiber stub;
the second end of the receptacle is at least partially received in the first end of the sleeve; and
one or both of the sleeve and the receptacle comprises a radial flange; and
a ferrule positioned within at least a portion of the receptacle and configured to be optically aligned with the fiber stub, the ferrule and the fiber stub forming an optical path; and
a retention device comprising:
a retention sleeve configured to surround a portion of the receptacle, the retention sleeve comprising:
an interior flange at a first end of the retention sleeve and configured to be positioned against a fiber side of the fiber stub flange of the fiber stub; and
a retention clip slot at a second end of the retention sleeve, opposite the first end of the retention sleeve;
a spring comprising a central axis substantially parallel to the optical path, a first end of the spring configured to apply a first force to the fiber side of the fiber stub flange and a second end of the spring configured to apply a third force, opposite the first force, to the interior flange; and
a retention clip configured to be inserted into the retention clip slot and configured to apply a second force to an optoelectronic device side of the receptacle flange, the retention clip located between the receptacle flange and the radial flange, wherein the first force and the second force are applied to maintain the ferrule and the fiber stub in close proximity.

* * * * *